United States Patent
Zhong

(10) Patent No.: US 8,964,827 B2
(45) Date of Patent: Feb. 24, 2015

(54) ADAPTATION OF EQUALIZER SETTINGS USING ERROR SIGNALS SAMPLED AT SEVERAL DIFFERENT PHASES

(71) Applicant: LSI Corporation, San Jose, CA (US)

(72) Inventor: Lizhi Zhong, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1 day.

(21) Appl. No.: 13/793,274

(22) Filed: Mar. 11, 2013

(65) Prior Publication Data

US 2014/0254655 A1 Sep. 11, 2014

Related U.S. Application Data

(60) Provisional application No. 61/773,983, filed on Mar. 7, 2013.

(51) Int. Cl.
*H03H 7/30* (2006.01)
*H04L 27/01* (2006.01)

(52) U.S. Cl.
CPC .................................... *H04L 27/01* (2013.01)
USPC ........................................................ 375/233

(58) Field of Classification Search
USPC .......................................... 375/229, 232, 233
See application file for complete search history.

(56) References Cited

U.S. PATENT DOCUMENTS

| | | | |
|---|---|---|---|
| 5,327,460 A | 7/1994 | Batruni | 375/14 |
| 5,345,476 A | 9/1994 | Tsujimoto | 375/14 |
| 5,367,540 A | 11/1994 | Kakuishi et al. | 375/103 |
| 5,414,733 A | 5/1995 | Turner | 375/233 |
| 5,513,216 A | 4/1996 | Gadot et al. | 375/233 |
| 5,561,687 A | 10/1996 | Turner | 375/233 |
| 5,604,769 A | 2/1997 | Wang | 375/229 |
| 5,617,450 A | 4/1997 | Kakuishi et al. | 375/230 |
| 5,748,674 A | 5/1998 | Lim | 375/233 |
| 5,793,801 A | 8/1998 | Fertner | 375/219 |
| 6,055,269 A | 4/2000 | Drost et al. | 375/232 |
| 6,115,418 A | 9/2000 | Raghavan | 375/233 |
| 6,144,697 A | 11/2000 | Gelfand et al. | 375/233 |
| 6,178,198 B1 | 1/2001 | Samueli et al. | 375/214 |
| 6,252,904 B1 | 6/2001 | Agazzi et al. | 375/233 |
| 6,400,761 B1 | 6/2002 | Smee et al. | 375/232 |
| 6,459,730 B1 | 10/2002 | Samueli et al. | 375/233 |
| 6,775,529 B1 | 8/2004 | Roo | 455/296 |
| 6,870,881 B1 | 3/2005 | He | 375/233 |
| 7,167,516 B1 | 1/2007 | He | 375/232 |
| 7,257,181 B2 | 8/2007 | Jones et al. | 375/350 |
| 7,937,605 B2 * | 5/2011 | Rea et al. | 713/503 |
| 8,031,765 B1 | 10/2011 | He | 375/233 |
| 2008/0107166 A1 * | 5/2008 | Lee | 375/232 |
| 2010/0020860 A1 | 1/2010 | Dai et al. | 375/231 |
| 2010/0177816 A1 | 7/2010 | Malipatil et al. | 375/233 |

* cited by examiner

*Primary Examiner* — Kevin Kim
(74) *Attorney, Agent, or Firm* — Christopher P. Maiorana, PC

(57) ABSTRACT

An apparatus includes an error sample generating circuit and an adaptation circuit. The error sample generating circuit is generally configured to generate error samples at a plurality of phases. The adaptation circuit may be configured to adjust one or more equalizer settings based upon a data sample and the error samples.

20 Claims, 14 Drawing Sheets

600

602
DETERMINE ALPHA AND BETA COEFFICIENTS (E.G., BASED ON DFE FEEDBACK WAVEFORM OR SET BASED ON USER INPUT

604
GENERATE PLURALITY OF ERROR SIGNALS (EK1-EKQ) FOR EVERY SYMBOL

606
ADJUST ONE OR MORE OF EQUALIZER PARAMETERS AND SAMPLING PHASE BASED UPON ALPHA, BETA, THE PLURALITY OF ERROR SIGNALS AND A DATA SAMPLE

FIG. 16

ADAPTATION OF EQUALIZER SETTINGS USING ERROR SIGNALS SAMPLED AT SEVERAL DIFFERENT PHASES

FIELD OF THE INVENTION

The invention relates to communications generally and, more particularly, to a method and/or apparatus for implementing adaptation of equalizer settings using error signals sampled at several different phases.

BACKGROUND OF THE INVENTION

In communications systems, vertical and horizontal eye margins of a sampled signal are measures of system performance. The vertical eye margin at the desired sampling point should be as large as possible, such that the sampled data is the same as the original data transmitted, even with the presence of latch offset and latch sensitivity. Jitter can cause the actual sampling point to move away from the desired sampling point momentarily. The vertical eye margin at the actual sampling point is what really matters. However, the vertical eye margin at the actual sampling point varies with the sampling point. Instead, the horizontal eye margin is used. The horizontal eye margin measures the range of the sampling phases within which the vertical eye margin is above a predefined threshold. The predefined threshold defines the point beyond which the error is eliminated or minimized.

It would be desirable to implement adaptation of equalizer settings using error signals sampled at several different phases.

SUMMARY

The invention concerns an apparatus including an error sample generating circuit and an adaptation circuit. The error sample generating circuit is generally configured to generate error samples at a plurality of phases. The adaptation circuit may be configured to adjust one or more equalizer settings based upon a data sample and the error samples.

BRIEF DESCRIPTION OF THE DRAWINGS

Embodiments of the invention will be apparent from the following detailed description and the appended claims and drawings in which:

FIG. 16 is a flow diagram illustrating a process for adapting parameters of one or more equalizers in a receiver based upon error signals sampled at several different phases in accordance with an embodiment of the invention;

DETAILED DESCRIPTION OF THE PREFERRED EMBODIMENTS

Figure 1:
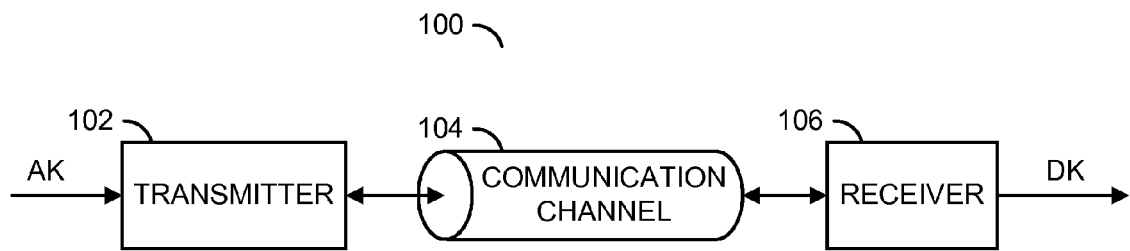
FIG. 1 is a diagram illustrating a communication system including a receiver in which embodiments of the invention may be implemented.

Embodiments of the invention generally provide a method and an apparatus implementing adaptation of equalizer settings using error signals sampled at several different phases. In some embodiments, the apparatus may include an inter symbol interference (ISI) cancellation circuit and a detector circuit. The inter symbol interference (ISI) cancellation circuit is generally configured to minimize ISI at data sampling and crossing sampling points in a symbol interval of an input signal. A plurality of detector circuits may be configured to generate error samples at a plurality of phases. An adaptation circuit may be configured to adjust equalizer settings and/or sampling phases based upon a data sample and the error samples. Embodiments of the invention may include providing a method and/or apparatus for implementing adaptation of equalizer settings using error signals sampled at several different phases that may (i) combine the best of center equalization and edge equalization, (ii) be configurable to provide only center equalization, only edge equalization or some combination of center equalization and edge equalization, (iii) be used with both optical channel and backplane applications, (iv) have low implementation cost, and/or (v) be implemented with no additional analog circuits in systems having both bang-bang clock data recovery (CDR) and decision feedback equalization (DFE).

Equalizer adaptation allows an equalizer to work at an optimal setting for whatever channel the equalizer is connected to, without any human intervention. There are two types of adaptation schemes. The difference is mainly from the optimization goal. When an adaptation scheme aims to minimize the error at the data sampling point, the adaptation scheme is called center equalization. When an adaptation scheme aims to minimize jitter at the crossing sampling point (e.g., at a different sampling phase from the data sampling point, typically 90 degrees before or after the data sampling point, but some other phase difference is possible), the adaptation scheme is called edge equalization. Center equalization typically results in maximum vertical margin at the data sampling point, although this may not always be the case. Edge equalization typically results in maximum horizontal margin, although this may not always be the case.

Center equalization defines an error signal (e.g., EKD) as the difference between a signal (e.g., RK) at an input of a detector and a target level of a data sample (e.g., H0*DK) at the data sampling point (e.g., EKD=RK−H0*DK). In one example, an error capture latch may be used to capture and sample the input signal RK at the data sampling phase. Edge equalization defines an error signal (e.g., EKX) based upon a signal sample (e.g., XK) sampled at a crossing sampling phase. The error signal may be determined, in one example, based upon whether a transition occurs between data samples (e.g., DK, DK(1)) sampled before and after the crossing sample XK. For example, the error signal may be generated such that EKX=0 if DK=DK(1), that is no transition, and EKX=XK if there is a transition, DK=−DK(1). The crossing sample XK is the error sampled at a particular phase. In one example, capture latches may be used to capture error samples at several different phases from the data sampling phase. The sampled signal(s) may be the same as the input signal to the data capture latch (e.g., R(t), RK, etc.), the signal before a DFE summing node (e.g., Y(t), YK, etc.), or one or more signals from other points in the receiver path. In general, signals in the time domain may be represented as functions of time (e.g., Y(T), R(T), F(T), etc.) and signals in the digital domain may be represented as samples (e.g., YK, RK, FK, EK, etc.).

Conventional adaptation techniques use either only center equalization or only edge equalization. As a result, a compromise has to be made between the vertical and horizontal eye margins. Embodiments in accordance with the invention combine the best of the two approaches by using error signals sampled at both the data sampling phase and other phases that are different from the data sampling phase. Embodiments of the invention may combine the two approaches in different ways. In one example, a linear combination of the mean squared error (MSE) of the error signals sampled at different phases may be generated and the total mean squared error minimized. For example, a function of the mean squared error of two error signals may be defined (e.g., $f(E[EK1^2], E[EK2^2])$) and the output of the function minimized.

An embodiment of the invention may utilize adaptation of a continuous time linear equalizer (CT-LE) gain to minimize a linear combination of the mean squared error of the error signals EK1 and EK2 sampled at two different phases (e.g., $ALPHA*E[EK1^2]+BETA*E[EK2^2]$). Different ratios of ALPHA and BETA may be used to provide different levels of tradeoff between the vertical and horizontal eye margins. In one example, an adaptation circuit may be implemented with values of ALPHA and BETA that are configurable (e.g., automatically set or configured by users). The implementation of an adaptation circuit with configurable values for ALPHA and BETA generally allows the same adaptation circuit to also be used in either center equalization only or edge equalization only applications. For example, optical module interfaces prefer an edge equalized linear equalizer and backplanes prefer a center equalized linear equalizer. To cover both applications, a conventional system would need to use two sets of adaptation circuits, with one of the adaptation circuits being disabled at any given time. In contrast to conventional approaches, an adaptation circuit implemented in accordance with an embodiment of the invention could simply set BETA to 0 to get center equalization for backplanes and set ALPHA to 0 to get a edge equalized linear equalizer for the optical channels. In an example with two error signals (e.g., EK1 and EK2), the corresponding gradient may be implemented as (ALPHA*(−EK1)+BETA*EK2)*DK(I), where DK(I) refers to the Ith data bit before the Kth bit, or the (K−I)th bit.

In some embodiments, four samples (e.g., I=2, 3, and 4) may be added together and the sum used to adjust the gain of the linear equalizer. For example, the gradient may be implemented as (ALPHA*(−EK1)+BETA*EK2)*(DK(1)+DK(2)+DK(3)+DK(4)). The gradient may be presented to the adaptation loop filter, which averages out the transient changes and outputs the adjustment to the linear equalizer gain.

Another embodiment is the adaptation of the DFE tap weights. In one example, a tap position h1 is still adapted using a gradient of −EK1*DK(1), while h2 and beyond are adapted using the gradient (ALPHA*(−EK1)+BETA*EK2)*DK(I)) with I being no less than 2. Since h2 and beyond are adapted using the linear combination of mean squared error of the error signals sampled at two different phases, the converged tap weights have higher values than would be achieved from center equalization, allowing the tap weights to reduce the mean squared error (e.g., at the crossing, which is $E[EKX^2]=$ . . . +(P0.5−P−0.5−g1*H1)*DK(1)+(P1.5−H2)*DK(2)+(P2.5−H3)*DK(3)+. . . . In general, making H2, H3, etc. larger reduces the terms (P1.5−H2), (P2.5−H3), . . . and consequently the mean squared error $E[EKX^2]$.

Simulations confirm that the overall MSE is reduced with the new scheme. For simpler implementation in the digital domain, ALPHA and BETA may be chosen to be integers. For example, (ALPHA,BETA) may be (2,1), (4,1), (1,1) or (1,0), (0,1). In another embodiment of the invention, pole and gain of the CT-DFE may be adapted using doubled sampled error signals.

Although the settling point of bang-bang CDR is affected only by the first tap crossing ISI, the eye of the signal at the input to the data capture latch is generally impacted by all the crossing ISI taps, which make the zero crossings spread over a wider region, reducing the horizontal eye margin. Double rate DFE can cancel ISI at both data sampling point and at the zero crossings of the same input signal. It is yet another example how error signals sampled at different phases may be used. To adapt linear equalizers, a double rate virtual DFE may be used, which like the real double rate DFE, uses error signals sampled at different phases. However, the double rate virtual DFE does not require the DFE circuit to run at twice the full data rate, nor does the double rate virtual DFE require twice the feedback paths. In general, the error signals may be sampled at one or more phases. The greater the amount of information that is available, the better the performance. One example is to sample before and after the zero crossing to obtain early and late information.

Referring to FIG. 1, a block diagram of a system 100 is shown illustrating a communication system in which adaptation schemes in accordance with embodiments of the invention may be implemented. The system 100 may be implemented as multiple circuits or devices, or on an integrated circuit. The system 100 may include a block (or circuit) 102, a block (or circuit) 104 and a block (or circuit) 106. The system 100 may implement a serializer-deserializer (e.g., SerDes) apparatus. In a SerDes apparatus (or system), parallel data may be serialized in a transmitter (e.g., block 102), transferred as serial data on a communication channel (e.g., block 104) and subsequently deserialized in a receiver (e.g., block 106) back into the parallel data. The blocks 102-106 may represent modules and/or blocks that may be implemented as hardware, software, a combination of hardware and software, or other implementations. A signal (e.g., AK) may be received by the circuit 102. The signal AK may implement a data signal. A signal (e.g., DK) may be generated by the circuit 106. The signal DK may carry recovered data.

The block 102 may implement a transmitter circuit. The block 102 is generally operational to generate signals carrying data to be communicated to the block 106. The block 102 may also be operational to receive signals carrying data received from the block 106. The signals may be communicated between the block 102 and the block 106 via the block 104. The block 102 may be fabricated as one or more integrated circuits. The block 104 may be fabricated as one or more of traces, wires, transmission lines, optical fiber, and wireless media. The block 106 may be fabricated as one or more integrated circuits.

The circuit 102 may participate in a transmitter adaptation capability to account for channel pulse (or impulse) response characteristics of the circuit 104. A filter within the circuit 102 may be initially adapted to the circuit 104 based on an estimation of the channel pulse response. The adaptation generally involves adjusting one or more tap weights of the filter. After the initial adaptation, the adaptation may be performed continuously to account for changing conditions in the circuit 104. In some embodiments, the filter may be implemented as a finite impulse response (e.g., FIR) filter. Other filters may be implemented to meet the criteria of a particular application.

The block 104 may implement a communication channel. The block 104 is generally operational to carry the data communicated from the block 102 to the block 106. The block 104 may also carry data communicated from the block 106 to the block 102. The channel pulse response characteristics of the block 104 generally cause distortions in amplitude and/or phase of the data signals as the data signals propagate from one port of the block 104 to the other. The channel pulse response characteristics may also change over time and/or temperature. Implementations of the block 104 may include, but are not limited to, one or more transmission medium such as air, wire, transmission line, optical fibre, Ethernet and the like.

The block 106 may implement a receiver circuit. The block 106 is generally operational to receive signals from the block 102 via the block 104. The block 106 may also be operational to send signals to the block 102 via the block 104. The block 106 may include a receiver adaptation capability to account for the pulse response characteristics of the blocks 102 and 104. One or more equalizers within the block 106 may be initially adapted to the block 104 based on a sequence of pulses (or impulses) received from the block 102. The adaptation generally involves adjusting one or more tap weights and/or programmable gain values of the equalizers. Once the tap weights have converged, the tap weights may be used as an estimate of the channel pulse response characteristics of the block 104. The receiver adaptation may be performed continuously to account for changing conditions in the block 104. In some embodiments, the equalizers may be implemented as a liner equalizer (e.g., LE), continuous time liner equalizer (CT-LE), a decision feedback equalizer (e.g., DFE), and/or a continuous time decision feedback equalizer (e.g., CT-DFE). Other types and numbers of equalizers may be implemented to meet the criteria of a particular application.

Figure 2:
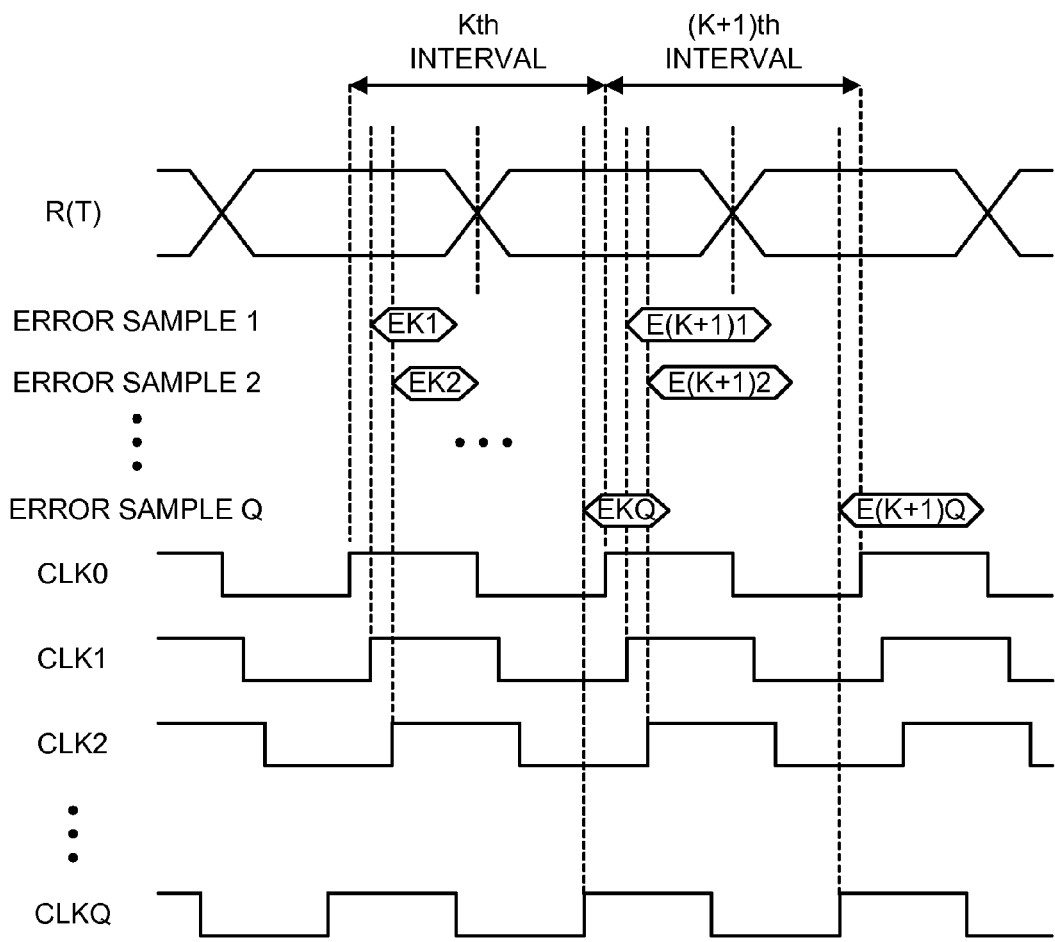
FIG. 2 is a diagram illustrating relationships between phases of a sampling clock signal and a data sampling eye in a full rate (or 1T) architecture.

Referring to FIG. 2, a diagram is shown illustrating a phase relationship between a number of clock signals (e.g., CLK0, ..., CLKQ) and a data sampling input eye of an input signal (e.g., R(T)). The clock signals CLK0, ..., CLKQ may be implemented as individual sampling clocks, phases of a sampling clock signal, and/or any combination thereof. In one example, rising edges of the clock signals CLK1, ... CLKQ generally occur some predetermined number of degrees relative to (e.g., before or after) a rising edge of the clock signal CLK0. Clock signals with other phases may be implemented accordingly to meet the design criteria of a particular implementation. The phase and frequency of the clock signals CLK0, ..., CLKQ may be adjusted such that the rising edge of the clock signal CLK0 corresponds with the center of a data input eye for the signal R(T) and the rising edges of the clock signals CLK1, ..., CLKQ correspond with points between the center of a data input eye and the crossing point of the signal R(T). However, other relationships may be implemented accordingly to meet the design criteria of a particular implementation.

In various embodiments, a number of error samples (e.g., EK1, ... EKQ, E(K+1)1, ..., E(K+1)Q, etc.) comprise samples of the signal R(T) corresponding with respective rising edges of the signals (or phases) CLK1, ..., CLKQ. Note that Q is used to represent the number of the error samples and respective clock signals (e.g., CLK1, ..., CLKQ, EK1, ..., EKQ, E(K+1)1, ..., E(K+1)Q, etc.) merely to avoid confusion with other letters used to represent numbers of items (e.g., L, M, N, etc.), and not meant to indicate any relationship between the number of the various items and the number of error samples that may be implemented. The letters L, M, N, Q, etc. are used to indicate that any number of clocks, phases, taps, etc. may be implemented to meet the design criteria of a particular implementation.

Figure 3:
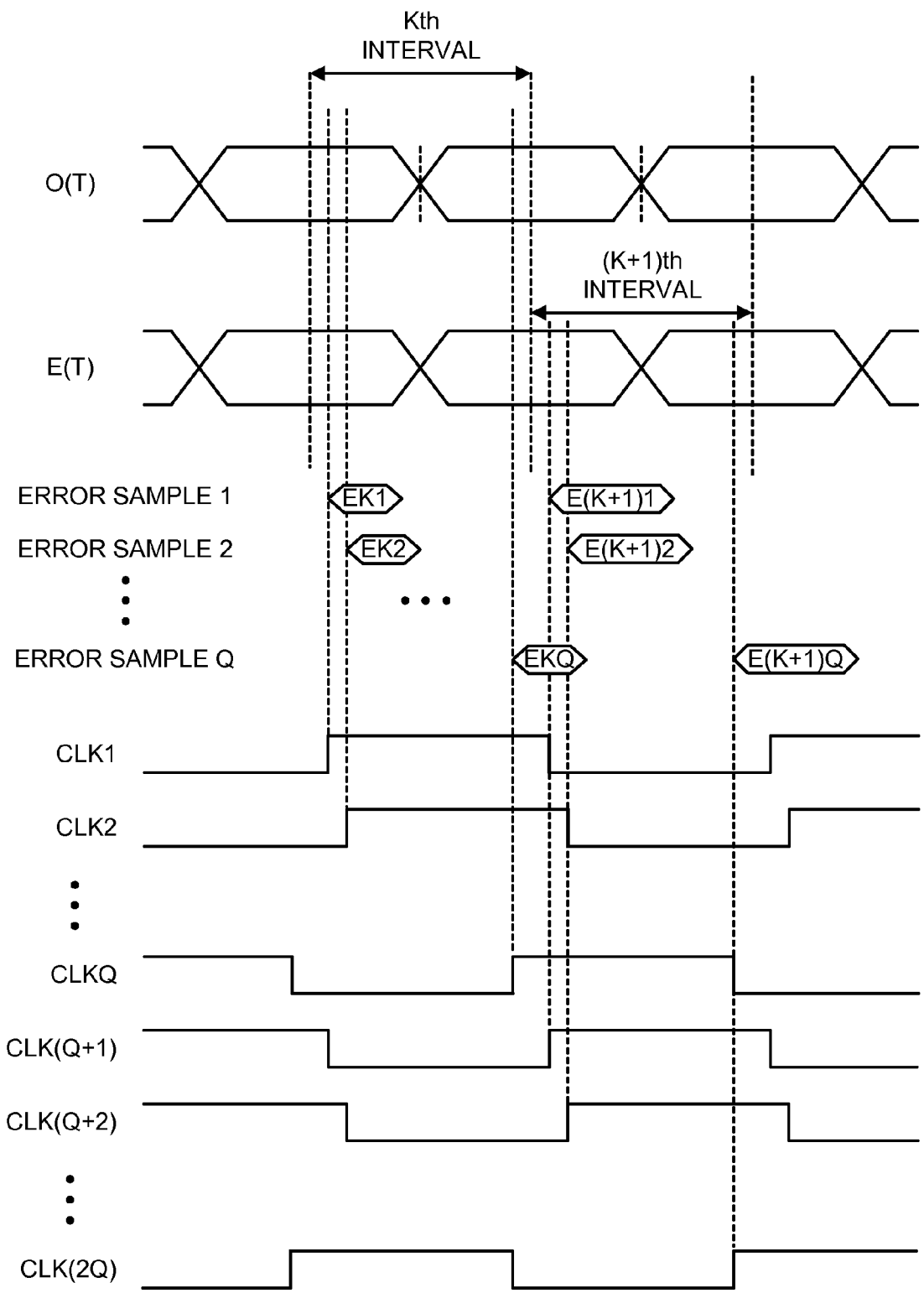
FIG. 3 is a diagram illustrating relationships between phases of a sampling clock signal and a data sampling eye in a half rate (or 2T) architecture.

Referring to FIG. 3, a diagram is shown illustrating relationships between phases of a sampling clock signal and the data sampling eye in the 2T architecture. In one example, even data samples (e.g., DK, DK(2), etc.) may be generated by sampling a signal (e.g., E(T)) on the rising edge of the clock signal CLK0(2). Odd data samples (e.g., DK(1), DK(3), etc.) may be generated by sampling a signal (e.g., O(T)) on the rising edge of the clock signal CLK0. The corresponding error samples may be generated similarly using the rising edges of a number of clock signals (or phases) CLK1, ..., CLKQ and CLK(Q+1), ..., CLK(2Q), respectively. In the 2T architecture (illustrated below in connection with FIGS. 12-14), the rising edges of the clock signals CLK1, ..., CLKQ occur some predetermined number of degrees relative to (e.g. before or after) the rising edge of the clock signal CLK0, the rising edges of the clock signals CLK(Q+1), ..., CLK(2Q) occur some predetermined number of degrees relative to (e.g. before or after) the rising edge of the clock signal CLK0(2), and so on.

Figure 4:
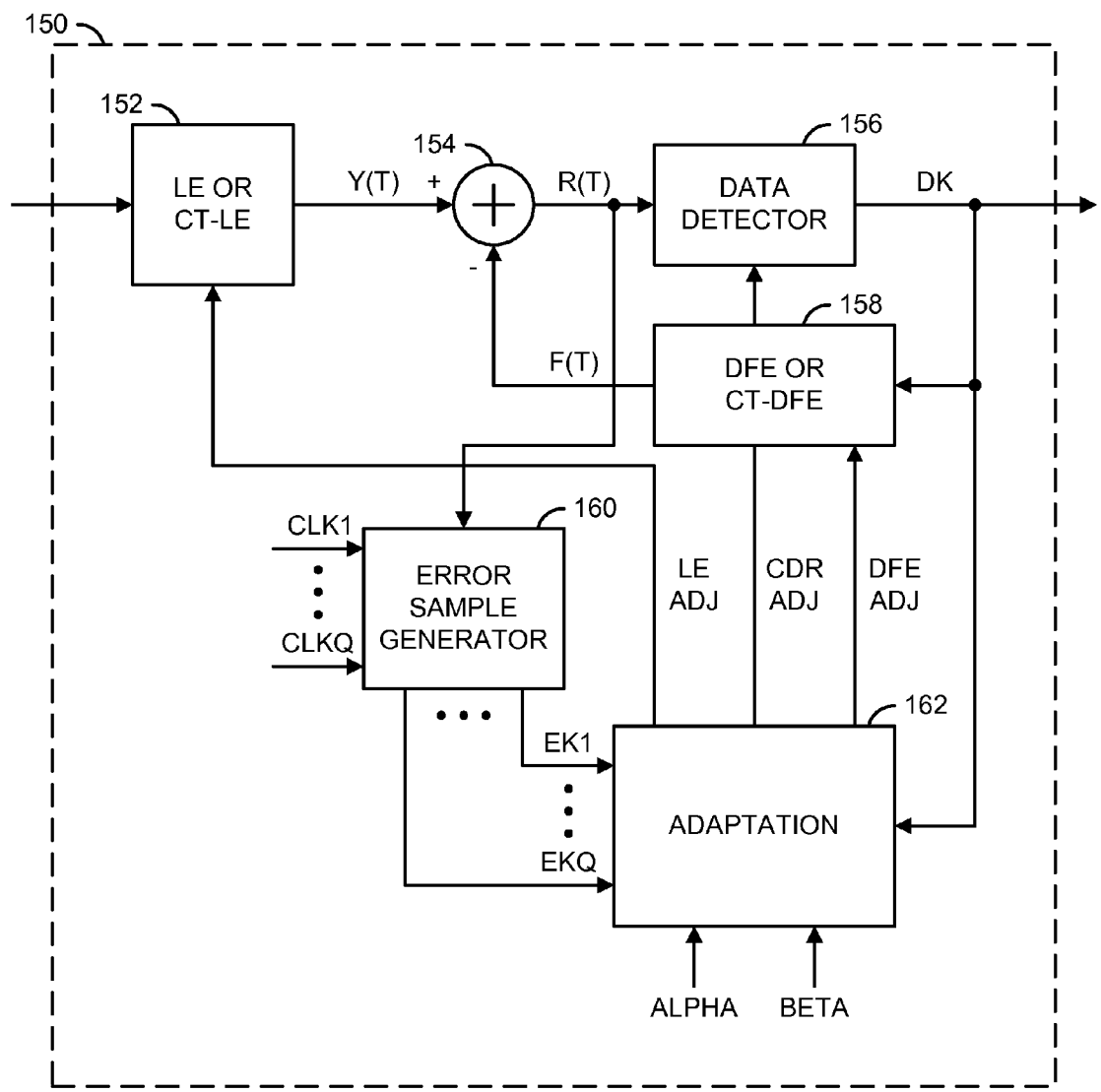
FIG. 4 is a diagram illustrating a receiver circuit including a variety of features in accordance with embodiments of the invention.

Referring to FIG. 4, a block diagram of a circuit 150 is shown illustrating an example receiver including a variety of features in accordance with embodiments of the invention. The circuit 150 generally comprises a block (or circuit) 152, a block (or circuit) 154, a block (or circuit) 156, a block (or circuit) 158, a block (or circuit) 160, and a block (or circuit) 162. The blocks 152-162 may represent modules and/or blocks that may be implemented as hardware, software, a combination of hardware and software, or other implementations.

The block 152 may implement either a linear equalizer (LE) or a continuous-time linear equalizer (CT-LE). The block 154 may be implemented as an adder. The block 156 may be implemented as a data detector (or latch). The block 158 may be implemented as either a discrete decision feedback equalizer (DFE) or a continuous-time decision feedback equalizer (CT-DFE). The block 160 may be implemented as an error sample generator. The block 162 may implement one or more adaptation loops (e.g., LE, DFE, CDR, etc.) of the circuit 150.

The block 152 may receive a receiver input signal at a first input and present a first equalized signal (e.g., Y(T)) at an output. The block 152 may have a second input through which a signal (e.g., LE ADJ) may control a gain, pole and/or tap weight(s) of the block 152. The block 154 may have a first input that may receive the signal Y(T), a second input that may receive a feedback signal (e.g., F(T)) and an output that may present a signal (e.g., R(T)). The block 154 may be configured to generate the signal R(T) by subtracting the signal F(T) from the signal Y(T) (e.g., R(T)=Y(T)−F(T)). The block 156 may have an input that may receive the signal R(T) and an output that may present a signal (e.g., DK). The signal DK may carry data samples taken (e.g., recovered) from the signal R(T) during a data input eye. The block 158 may have an input that receives the signal DK and an output that presents the signal F(T). The block 158 may be configured to generate the signal F(T) in response to the signal DK and a number of tap weights.

In some embodiments, the block 160 has an input that receives the signal R(T), a number of inputs that receive a number of clock signals (or phases) (e.g., CLK1, . . . , CLKQ) of a data sampling clock, and a number of outputs that present a number of signals (e.g., EK1, . . . , EKQ). The signals EK1, . . . , EKQ generally comprise error samples. The block 160 may be configured to generate the error samples EK1, . . . , EKQ in response to the signal R(T), the phases CLK1, . . . , CLKQ, and a predetermined threshold.

In some embodiments, the block 162 has a first input that receives the signal DK, a number of second inputs that receive the signals EK1, . . . , EKQ, a third input that receives a signal (e.g., ALPHA), and a fourth input that receives a signal (e.g., BETA). The signal ALPHA may comprise a first coefficient. The signal BETA may comprise a second coefficient. The block 162 may be configured to implement adaptation loops that determine (or adjust) one or more parameters (e.g., gain, pole, tap weight, etc.) of the blocks 152, 156, and 158 using the error sample signals EK1, . . . , EKQ along with the first coefficient ALPHA and the second coefficient BETA. In one example, the block 162 may be configured to implement a number of adaptation loops configured to determine a number of tap weight values (e.g., H1-HN) for a number of DFE taps of the block 158. In another example, the block 162 may be configured to adjust a gain parameter, pole parameter, and/or tap weights of the block 152. In still another example, the block 162 may be configured to implement both a number of adaptation loops configured to determine a number of tap weight values (e.g., H1-HN) for a number of DFE taps of the block 158 (or pole and gain parameters in the case of a CT-DFE) and an adaptation loop to adjust a gain parameter, pole parameter, and/or tap weights of the block 152.

Figure 5:
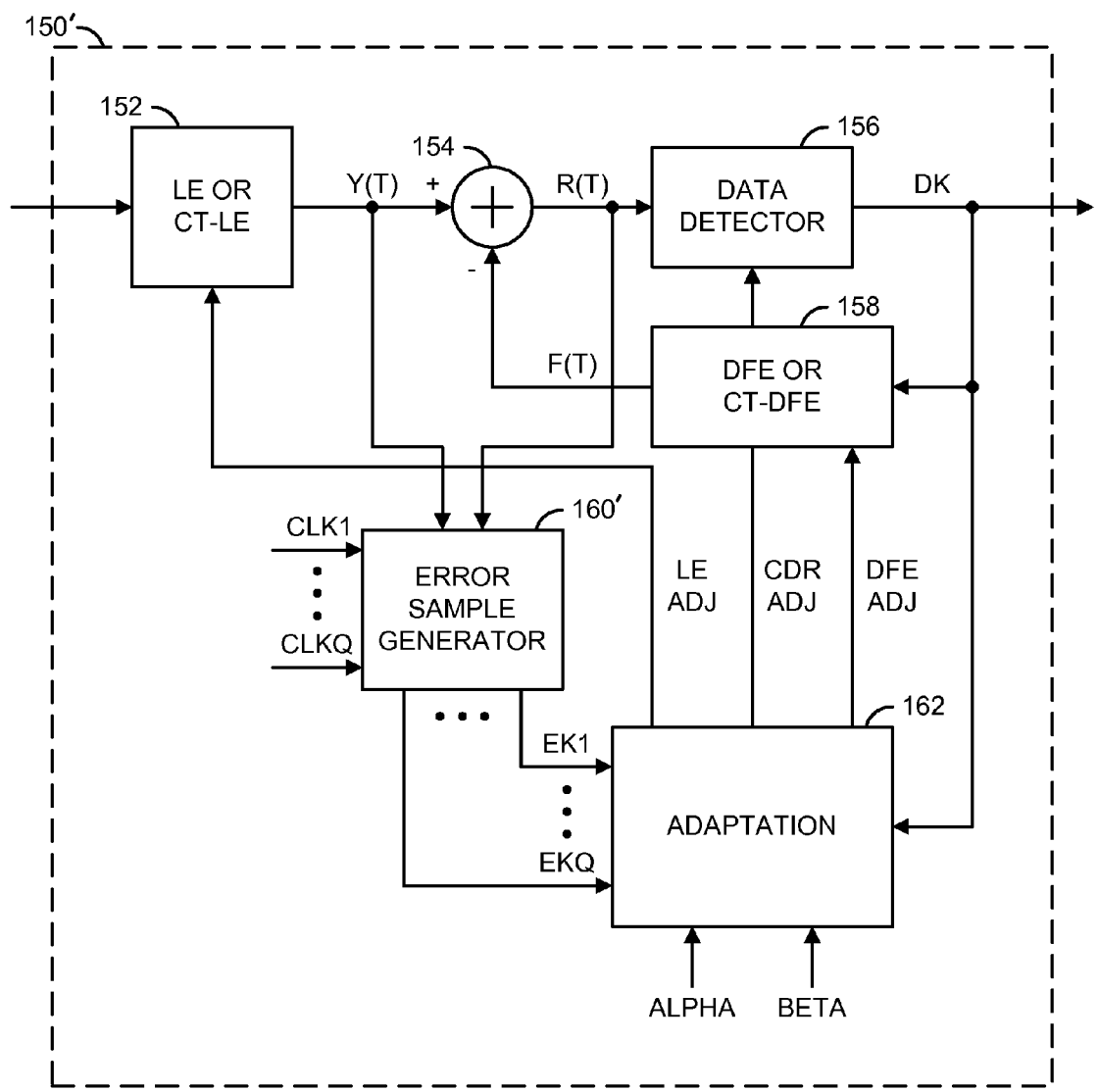
FIG. 5 is a diagram illustrating another receiver circuit including a variety of features in accordance with embodiments of the invention.

Referring to FIG. 5, a block diagram of a circuit 150' is shown illustrating another example receiver including a variety of features in accordance with embodiments of the invention. The circuit 150' may be implemented similarly to the circuit 150, except that the block 160 is replaced by a block 160' that can receive (sample) the signal prior to the summing node 154 (e.g., Y(T)) instead of or in addition to the signal after the summing node 154 (e.g., R(T)). For example, the signals Y(T) and R(T) may be sampled using respective phases from the signals CLK1, . . . , CLKQ. Other sampling points and/or multiple sampling points along the receiver path may be implemented accordingly to meet the design criteria of a particular implementation.

Figure 6:
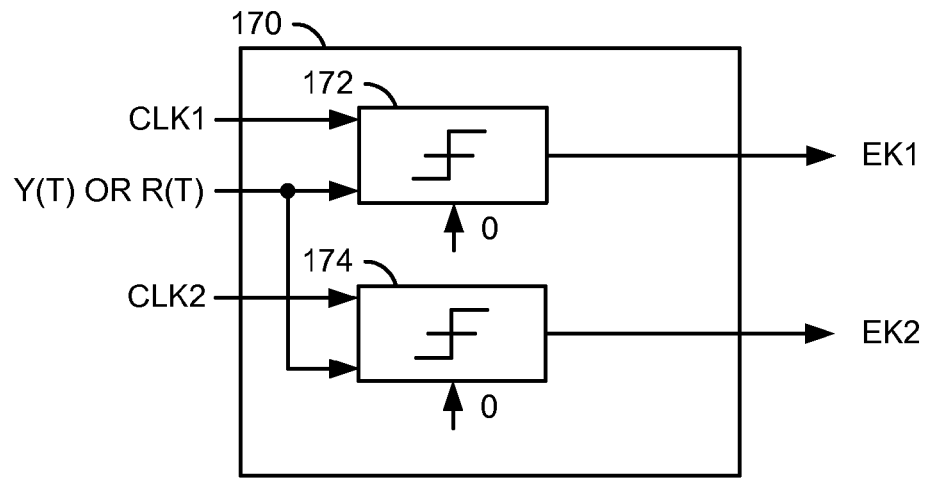
FIG. 6 is a block diagram illustrating an example implementation of an error sample generating circuit of FIGS. 4 and 5 in accordance with an embodiment of the invention.

Referring to FIG. 6, diagram of a module 170 is shown illustrating an error signal generator in accordance with embodiments of the present invention. The module 170 may be implemented to generate a signal EK1 and a signal EK2 based upon the signal Y(T) (or R(T)) and clock signals (or phases) CLK1 and CLK2. The module 170 may have a first input that may receive the signal Y(T) or R(T), a second input that may receive a first clock signal CLK1, a third input that may receive a second clock signal CLK2, a first output that may present the signal EK1, and a second output that may present the signal EK2. In some embodiments, the module 170 may comprise a block (or circuit) 172 and a block (or circuit) 174. The block 172 may be implemented as a capture latch. The block 174 may be implemented as a capture latch. The blocks 172 and 174 may have latch thresholds of 0.

The signal Y(T) or R(T) may be presented to a first input of the block 172 and a first input of the block 174. A second input of the block 172 may receive the clock signal or phase CLK1. A second input of the block 174 may receive the signal or phase CLK2. The signals EK1 and EK2 may be presented at respective outputs of the blocks 172 and 174.

Figure 7:
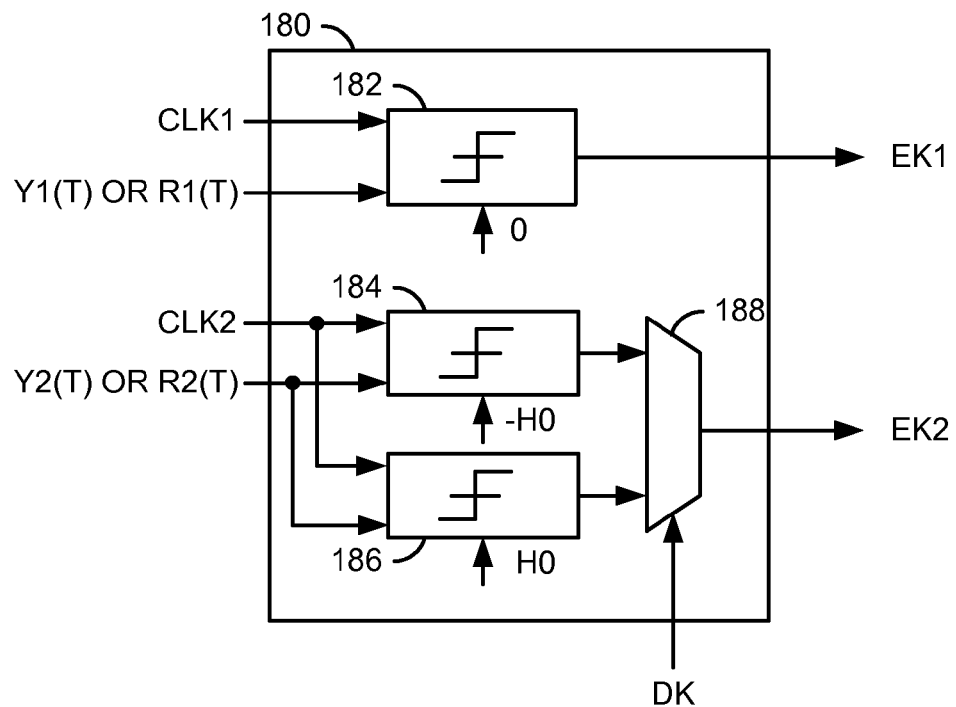
FIG. 7 is a block diagram illustrating another example implementation of the error sample generating circuit of FIGS. 4 and 5 in accordance with an embodiment of the invention.

Referring to FIG. 7, a block diagram of the circuit 180 is shown illustrating another example implementation of the error signal generator circuit in accordance with an example embodiment of the invention. In one example, the error signal generator circuit 180 may comprise a block (or circuit) 182, a block (or circuit) 184, a block (or circuit) 186, and a block (or circuit) 188. The blocks 182, 184, and 186 may be implemented as capture latches. The block 182 may be implemented having a crossing threshold of 0. The block 184 may be implemented having a crossing threshold of −H0. The block 186 may be implemented having a crossing threshold of H0. H0 generally represents a target level for the receiver circuit 150. The block 188 may be implemented as a multiplexer.

An input signal R1(T) or Y1(T) may be presented to a first input of the circuit 182. A clock signal CLK1 may be presented to a second input of the circuit 182. An output of the circuit 182 may present a first error sample (e.g., EK1). An input signal Y2(t) or R2(T) may be presented to a first input of the circuit 184 and a first input of the circuit 186. An output of the circuit 184 may be presented to a first data input of the circuit 188. An output of the circuit 186 may be presented to a second input of the circuit 188. A control input of the circuit 188 may receive the signal DK. The circuit 188 may have an output that may present the signal EK2. The signals Y1(T) and Y2(T) may be the same or different signals. The signals R1(T) and R2(T) may be the same or different signals.

Figure 8:
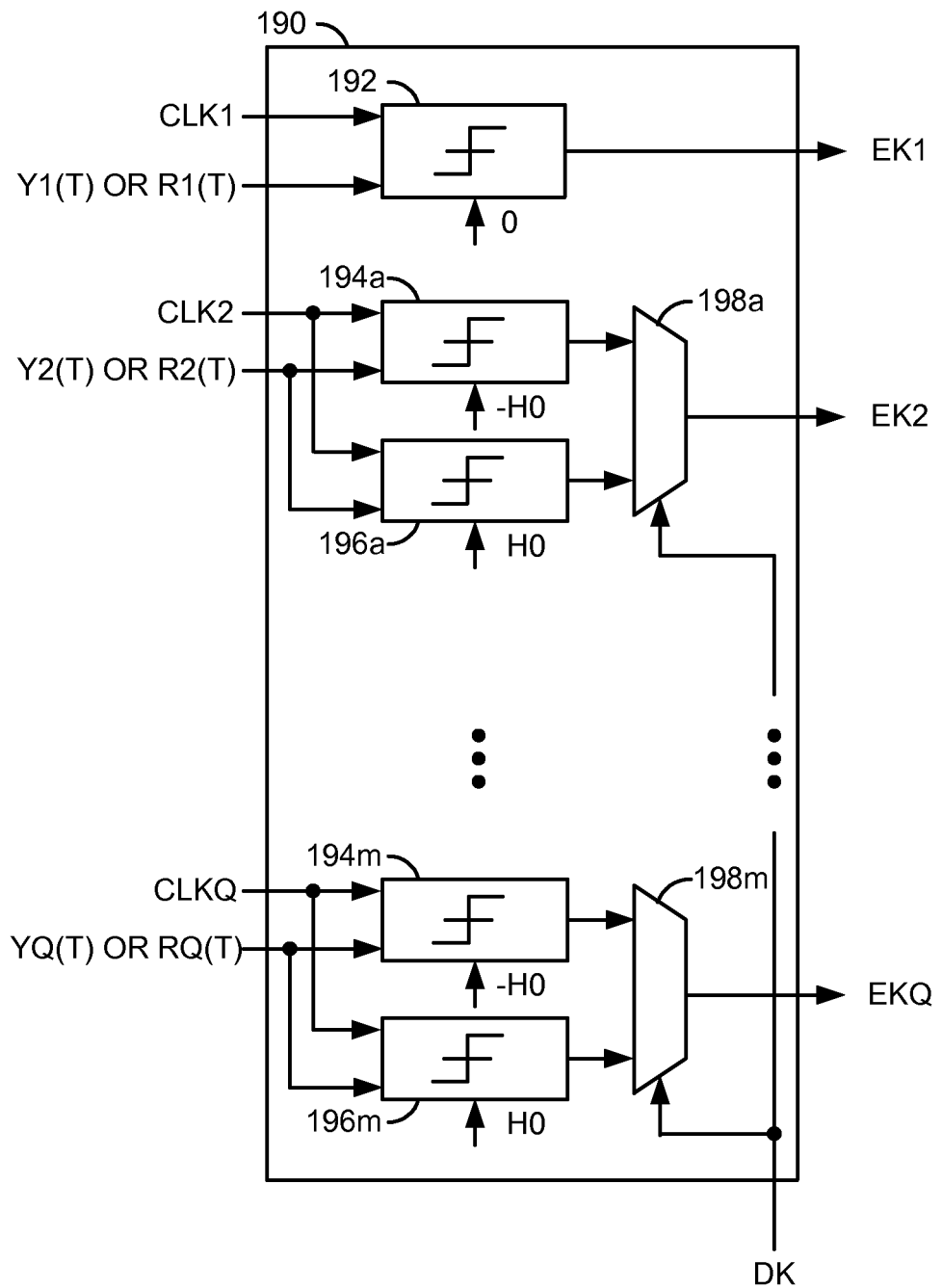
FIG. 8 is a block diagram illustrating still another example implementation of the error sample generating circuit of FIGS. 4 and 5 in accordance with an embodiment of the invention.

Referring to FIG. 8, a block diagram of the circuit 190 is shown illustrating another example implementation of the error signal generator circuit in accordance with an example embodiment of the invention. In some embodiments, the circuit 190 may have a number of inputs that receive a plurality of clock signals or phases (e.g., CLK1, . . . , CLKQ), a number of inputs that receive one or more input signals (e.g., Y1(T), Y2(T), . . . , YQ(T) or R1(T), R2(T), . . . , RQ(T)), an input that receives a data sample (e.g., DK), and a number of outputs that present a plurality of error sample signals (e.g., EK1, . . . , EKQ).

In one example, the error signal generator circuit 190 may comprise a block (or circuit) 192, a number of blocks (or circuits) 194a-194m, a number of blocks (or circuits) 196a-196m, and a number of blocks (or circuits) 198a-198m. The blocks 192, 194a-194m, and 196a-196m may be implemented as capture latches. The block 192 may be implemented having a crossing threshold of 0. The blocks 194a-194m may be implemented having a crossing threshold of −H0. The block 196a-196m may be implemented having a crossing threshold of H0. H0 generally represents a target level for the receiver circuit 150. The blocks 198a-198m may be implemented as multiplexers.

An input signal R1(T) or Y1(T) may be presented to a first input of the circuit 192. A clock signal CLK1 may be presented to a second input of the circuit 192. An output of the circuit 192 may present a first error sample (e.g., EK1). An input signal Y2(t) or R2(T) may be presented to a first input of the circuit 194a and a first input of the circuit 196a. An output of the circuit 194a may be presented to a first data input of the circuit 198a. An output of the circuit 196a may be presented to a second input of the circuit 198a. A control input of the circuit 198a may receive the signal DK. The circuit 198a may have an output that may present the signal EK2. The remaining circuits 194b-194m, 196b-196m, and 198b-198m may be configured similarly to generate the error sample signals EK3, . . . , EKQ based on (i) the clock signals CLK3, . . . , CLKQ, (ii) the inputs signals Y3(T), . . . , YQ(T) or R3(T), R2(T), . . . , RQ(T)), and the data sample DK. Any number, combination, permutation, etc. of the signals Y1(T), . . . , YQ(T) may be the same or different signals. Any number, combination, permutation, etc. of the signals R1(T), . . . , RQ(T) may be the same or different signals. Other thresholds in addition to H0 and −H0 may be implemented to meet the design criteria of a particular implementation.

Figure 9:
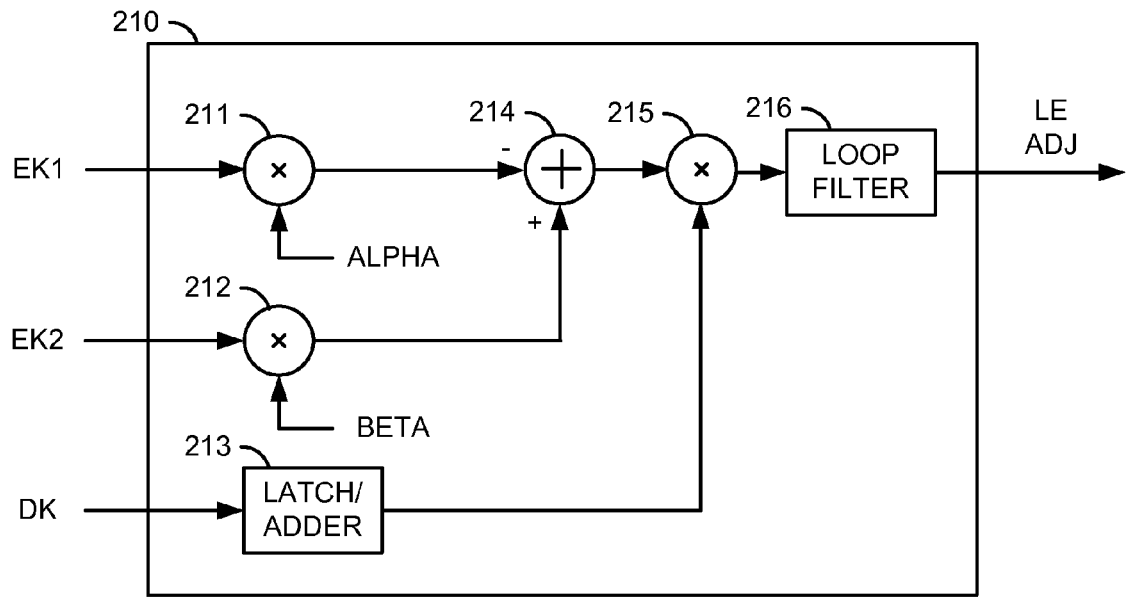
FIG. 9 is a block diagram illustrating an example implementation of the adaptation circuit of FIGS. 4 and 5 in accordance with an embodiment of the invention.

Referring to FIG. 9, a block diagram of the circuit 210 is shown illustrating an example implementation of an adaptation circuit in accordance with an example embodiment of the invention. In some embodiments, the circuit 210 may be implemented as part of the adaptation block 162 of FIGS. 4 and 5. In some embodiments, the circuit 210 comprises a block (or circuit) 211, a block (or circuit) 212, a block (or circuit) 212, a block (or circuit) 214, a block (or circuit) 215, and a block (or circuit) 216. The blocks 211, 212 and 215 may be implemented as multipliers. In some embodiments, the block 213 may be implemented as a latch. In other embodiments, the block 213 may be implemented as an adder circuit. The block 214 may be implemented as an adder. The block 216 may implement a loop filter circuit. In one example, the block 216 may be configured to adjust one or more parameters (e.g., gain, pole, tap weight(s), etc.) of a linear equalizer (LE) of a receiver.

The block 211 may be configured to generate a product of a first error sample (e.g., EK1) and a first coefficient (e.g., ALPHA). The block 212 may be configured to generate a product of a second error sample (e.g., EK2) and a second coefficient (e.g., BETA). The block 214 may be configured to determined a difference between the product of the error sample EK1 and the coefficient ALPHA and the product of the error sample EK2 and the coefficient BETA (e.g., BETA*EK2−ALPHA*EK1). The block 213 may be configured to store one or a sum of multiple data samples (e.g., DK, SUM(DK(i), i=1, . . . , 4), etc.). In some embodiments, the block 215 may implement a gradient (−ALPHA*EK1+BETA*EK2)*DK(I). In other embodiments, the block 215 may implement a gradient (−ALPHA*EK1+BETA*EK2)*(DK(1)+DK(2)+DK(3)+DK(4)). The block 216 may be configured to adjust the parameters of the linear equalizer based upon the gradient generated by the block 215.

Figure 10:
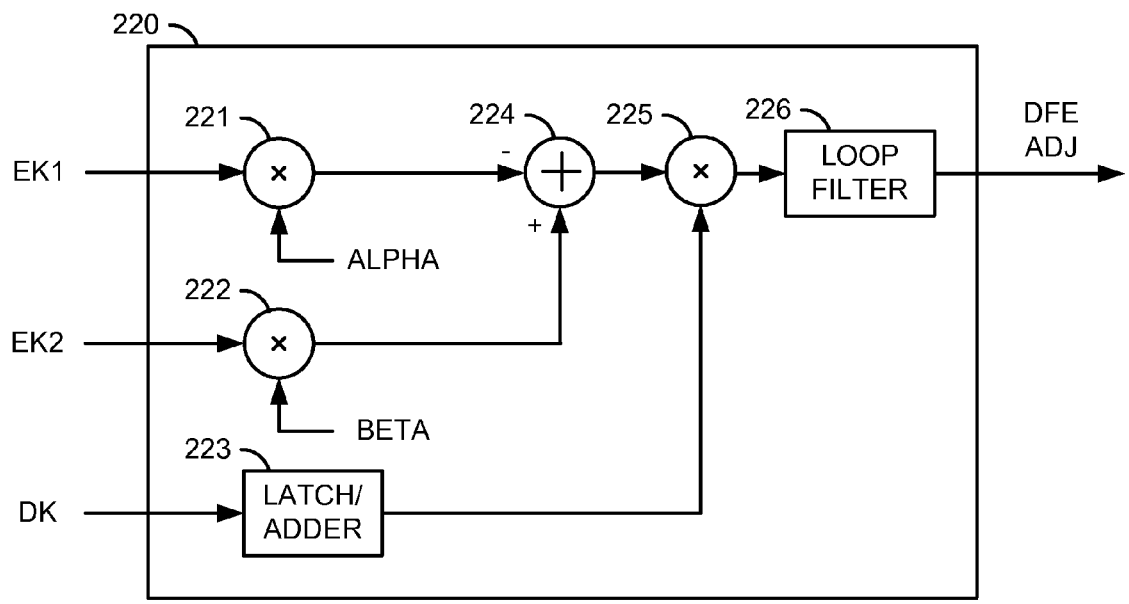
FIG. 10 is a block diagram illustrating another example implementation of the adaptation circuit of FIGS. 4 and 5 in accordance with an embodiment of the invention.

Referring to FIG. 10, a block diagram of the circuit 220 is shown illustrating another example implementation of an adaptation circuit in accordance with an example embodiment of the invention. In some embodiments, the circuit 220 may be implemented as part of the adaptation block 162 of FIGS. 4 and 5. In some embodiments, the circuit 220 comprises a block (or circuit) 221, a block (or circuit) 222, a block (or circuit) 223, a block (or circuit) 224, a block (or circuit) 225, and a block (or circuit) 226. The blocks 221, 221 and 225 may be implemented as multipliers. In some embodiments, the block 223 may be implemented as a latch. In other embodiments, the block 223 may be implemented as an adder circuit. The block 214 may be implemented as an adder. The block 226 may implement a loop filter circuit. In one example, the block 226 may be configured to adjust one or more parameters (e.g., gain, pole, tap positions, tap weights, etc.) of a decision feedback equalizer (DFE) of a receiver.

The block 221 may be configured to generated a product of a first error sample (e.g., EK1) and a first coefficient (e.g., ALPHA). The block 222 may be configured to generated a product of a second error sample (e.g., EK2) and a second coefficient (e.g., BETA). The block 224 may be configured to determined a difference between the product of the error sample EK1 and the coefficient ALPHA and the product of the error sample EK2 and the coefficient BETA (e.g., BETA*EK2−ALPHA*EK1). The block 223 may be configured to store one or a sum of multiple data samples (e.g., DK, SUM(DK(i), i=1, . . . , 4), etc.). In some embodiments, the block 225 may implement a gradient (−ALPHA*EK1+BETA*EK2)*DK(I). In other embodiments, the block 225 may implement a gradient (−ALPHA*EK1+BETA*EK2)*(DK(1)+DK(2)+DK(3)+DK(4)). The block 226 may be configured to adjust the parameters of the decision feedback equalizer based upon the gradient generated by the block 225.

Figure 11:
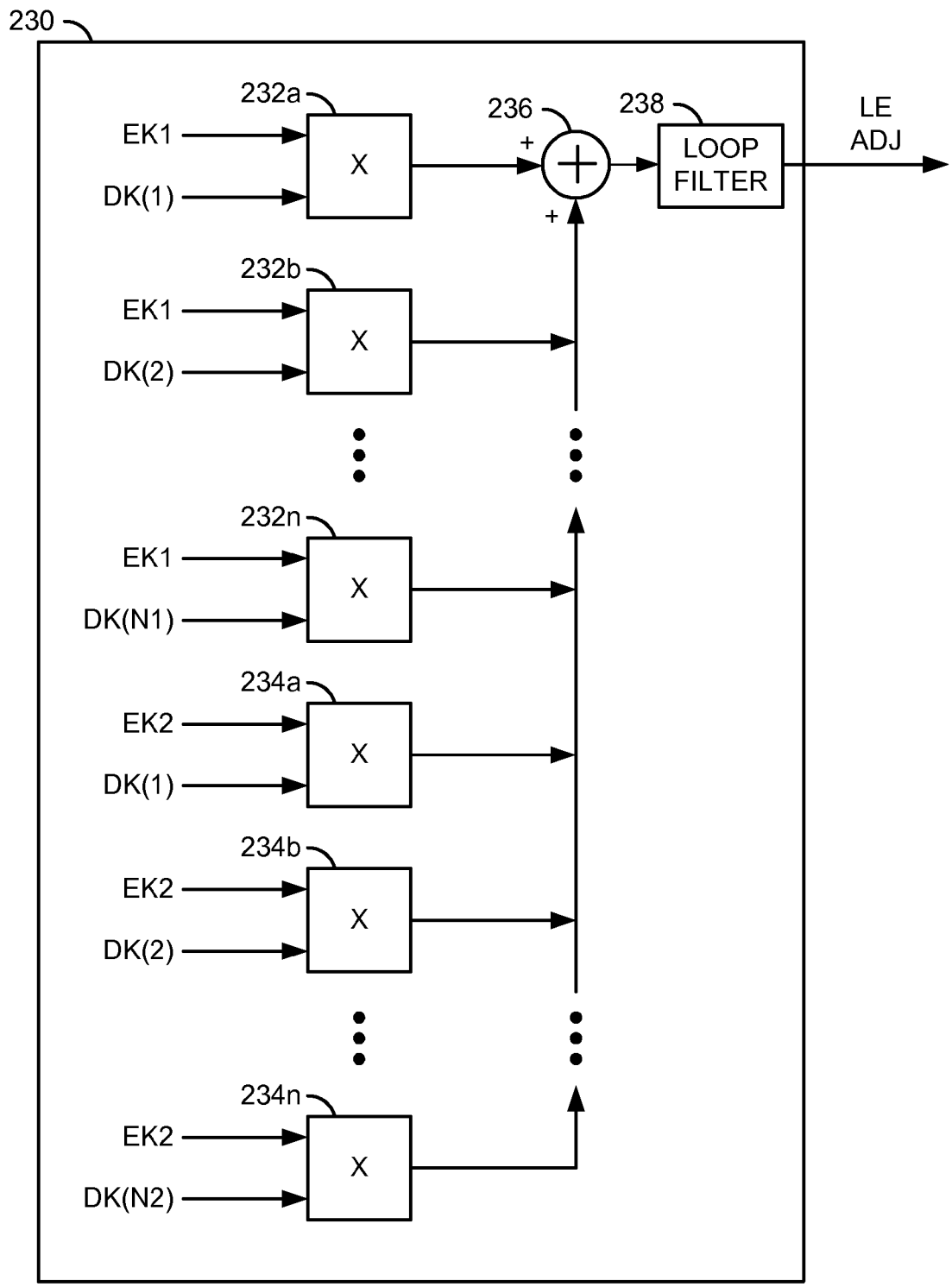
FIG. 11 is a block diagram illustrating still another example implementation of the adaptation circuit of FIGS. 4 and 5 in accordance with an embodiment of the invention.

Referring to FIG. 11, a block diagram of the circuit 230 is shown illustrating still another example implementation of an adaptation circuit in accordance with an example embodiment of the invention. In some embodiments, the circuit 230 may be implemented as part of the adaptation block 162 of FIGS. 4 and 5. In some embodiments, the circuit 230 comprises a number of blocks (or circuits) 232a-232n, a number of blocks (or circuits) 234a-234n, a block (or circuit) 236, and a block (or circuit) 238. The blocks 232a-232n and 234a-234n may be implemented as multipliers. The block 236 may implement an adder. The block 238 may implement a loop filter. In one example, the block 238 may be configured to adjust one or more parameters (e.g., gain, pole, tap weight, etc.) of a linear equalizer (LE) of a receiver.

Each of the blocks 232a-232n may be configured to generated a product of a first error sample (e.g., EK1) and a respective data sample (e.g., DK(1), . . . , DK(N1)). Each of the blocks 234a-234n may be configured to generated a product of a second error sample (e.g., EK2) and a respective data sample (e.g., DK(1), . . . , DK(N2)). The block 236 may be configured to generated a sum of the products generated by the blocks 232a-232n and 234a-234n (e.g., EK1*DK(1) EK1*DK(2)+ . . . +EK1*DK(N1)+EK2*DK(1)+EK2*DK(2)+ . . . +EK2*DK(N2). The sum generated by the block 236 may be employed by the block 238 to adjust one or more parameters (e.g., gain, pole, tap weight, etc.) of a linear equalizer (LE) of a receiver.

Figure 12:
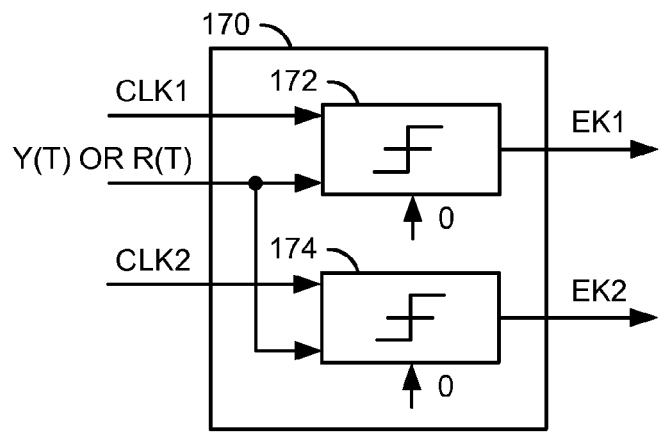
FIG. 12 is a diagram illustrating an error sample generating circuit and a bang-bang clock data recovery (CDR) circuit configured to generate a phase adjustment signal in accordance with an embodiment of the invention.
Figure 12:
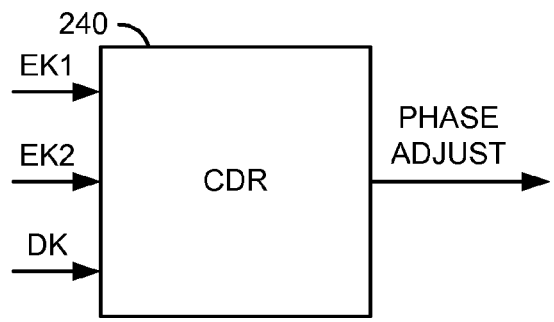
Figure 12:
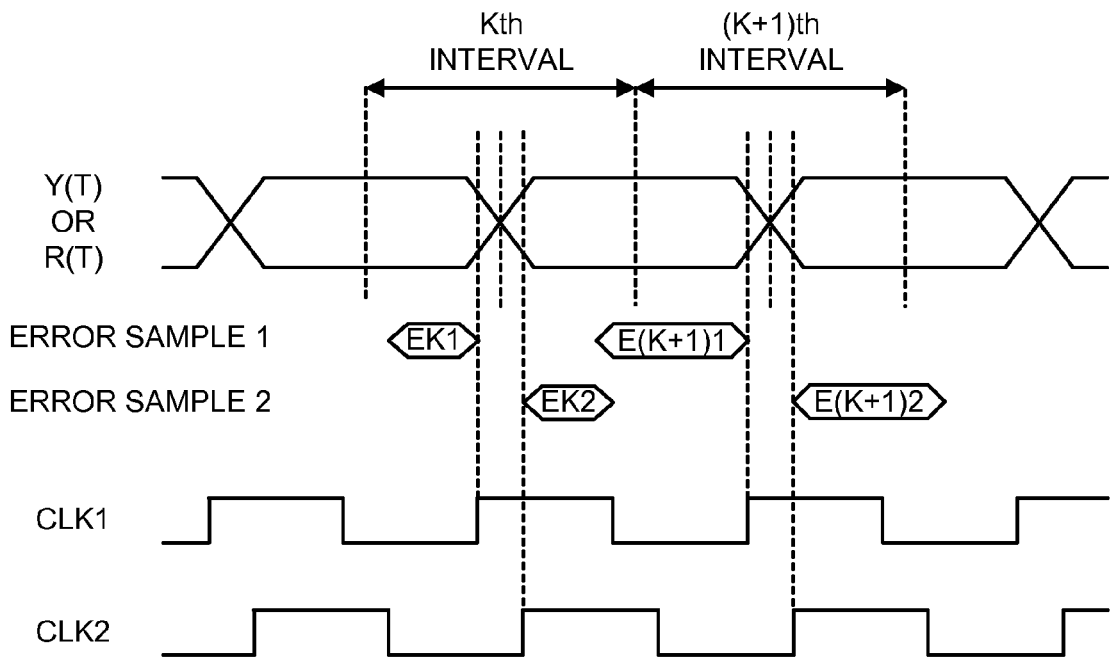

Referring to FIG. 12, a block diagram of the circuit 240 is shown illustrating an example implementation of a clock and data recovery (CDR) circuit in accordance with an example embodiment of the invention. The circuit 240 may be implemented to adjust one or more sampling phases of a receiver circuit. In some embodiments, the block 240 may be configured to utilize the error samples generated by the block 170 (described above in connection with FIG. 6). For example, the block 240 may be configured to adjust one or more sampling phases based on a gradient determined by a first coefficient ALPHA, a second coefficient BETA and the plurality of error samples generated by the block 170.

Figure 13:
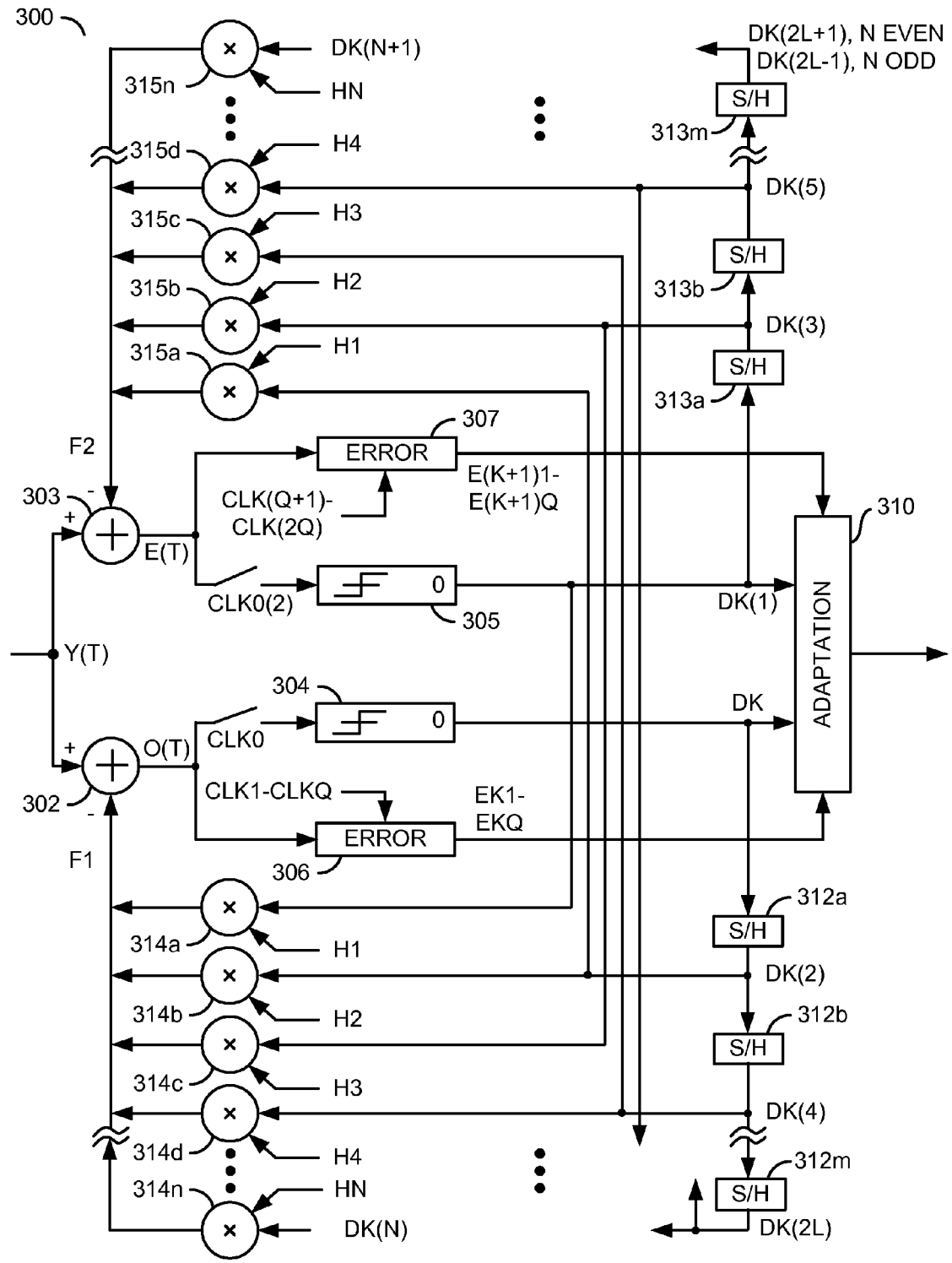
FIG. 13 is a diagram illustrating an example circuit implementing a half rate (or 2T) architecture decision feedback equalizer (DFE) and an adaptation circuit using error signals generated at a plurality of phases in accordance with an embodiment of the invention.

Referring to FIG. 13, a block diagram of a circuit 300 is shown illustrating an example implementation of a half rate (2T) DFE and adaptation circuit in accordance with an example embodiment of the invention. In one example, the circuit 300 may be implemented in a serializer/deserializer (SerDes) circuit. The circuit 300 may be implemented as part of a receiver. The circuit 300 generally implements a 2T-DFE structure comprising a first half and a second half. In one example, the first half of the circuit 300 may comprise a block (or circuit) 302, a block (or circuit) 304, a block (or circuit) 306, a block (or circuit) 310, a number of blocks (or circuits) 312a-112m, and a number of blocks (or circuits) 314a-314n. The second half of the circuit 300 may comprise a block (or circuit) 303, a block (or circuit) 305, a block (or circuit) 307, a number of blocks (or circuits) 313a-313m, and a number of blocks (or circuits) 315a-315n. Each half of the circuit 300 implements a respective set of the total number of DFE taps (e.g., N) used to provide decision feedback equalization. Each half of the circuit 300 generates half of the total number of data samples used for DFE. Each half of the circuit 300 generates half of the total number of data and error samples used for adaptation of one or more equalizers of the receiver in which the circuit 300 is implemented. Because each half of the circuit 300 generates only half of the data samples, the two halves may operate at a lower speed (e.g., one-half the data rate) than the data rate of the input signal (e.g., Y(T)). As would be apparent to those skilled in the relavent art based upon the description herein, the architecture of the circuit 300 may be scaled to any nT architecture, where n is an integer (e.g., 1, 2, 3, 4, . . . ). The blocks 302 to 315n may represent modules and/or blocks that may be implemented as hardware, software, a combination of hardware and software, or other implementations.

The blocks 302 and 303 may be implemented as adders. The blocks 304 and 305 may be implemented as latches. The blocks 306 and 307 may be implemented as error signal generators configured to generate a plurality of error signals (e.g., EK1, . . . , EKQ and E(K+1)1, . . . , E(K+1)Q, respectively). The error signals EK1, . . . , EKQ and E(K+1)1, . . . , E(K+1)Q may be used by adaptation loops in the circuit 310 to determine a number of tap weight values (e.g., H1-HN) for the respective DFE taps. The blocks 312a-312m and 313a-313m may implement sample and hold or shift register elements. The blocks 314a-314n and 315a-315n may be implemented as multipliers.

The block 302 may receive an input signal (e.g., Y(T)) at a first input and a feedback signal (e.g., F1) at a second input. An output of the block 302 may present a signal (e.g., O(T)) responsive to the input signal Y(T) and the feedback signal F1. The signal O(T) may be presented as an input to the blocks 304 and 306. Specifically, the signal O(T) may be sampled in response to a clock signal (e.g., CLK0) and the samples presented to an input of the block 304. The signal O(T) may be sampled by the block 306 in response to a plurality of clock signals or phases (e.g., CLK1, . . . , CLKQ). The samples generated by the block 306 may be presented to a first input of the block 310 as the signals EK1, . . . , EKQ. Note that Q is used to represent the number of the error samples and respective clock signals (e.g., CLK1, . . . , CLKQ, EK1, . . . , EKQ, E(K+1)1, . . . , E(K+1)Q, etc.) merely to avoid confusion with other letters used to represent numbers of items (e.g., L, M, N, etc.), and not meant to indicate any relationship between the number of the various items and the number of error samples that may be implemented. The letters L, M, N, Q, etc. are used to indicate that any number of clocks, phases, taps, etc. may be implemented to meet the design criteria of a particular implementation.

The block 304 may have a crossing threshold of zero. The block 304 generally presents a positive (e.g., 1) output when the sampled signal is above the respective threshold and a negative (e.g., −1) output when the sampled signal is below the respective threshold. The output of the block 304 may be randomly 1 or −1 when the respective input signal is very close to the threshold value since the difference may be very small and below the sensitivity of the latch (e.g., may take a very long time to integrate to produce a signal that is large enough).

An output of the block 304 (e.g., DK) may be presented to a second input of the block 310 and an input of the block 312a. An output of the block 312a (e.g., DK(2)) may be presented to an input of the block 312b, a first input of the block 314b, and a first input of the block 315a. An output of the block 312b (e.g., DK(4)) may be presented to an input of the block 312c (not shown), a first input of the block 314d, and a first input of the block 315c. The blocks 312c-312m may be connected similarly and may present respective data samples (e.g., DK(6), DK(8), . . . , DK(2L−2), DK(2L)). The block 314a may have a second input that receive a signal (e.g., H1). The signal H1 may represent a tap weight. The blocks 314b-314n may similarly receive respective tap weight signals (e.g., H2, H3, . . . , H(N−1), HN) and respective data samples (e.g., DK(2), DK(3), . . . , DK(N−1), DK(N)).

The tap weights H1, H2, . . . , H(N−1), and HN may be determined through adaptation based on the signals EK1, . . . , EKQ, E(K+1)1, . . . , E(K+1)Q, DK, DK(1), DK(2), DK(3), . . . , DK(N−1), DK(N). In one example, the block 310 may implement an adaptation technique to adjust the tap weights based on the error signals and the data samples. The blocks 312a-312m and 314a-314n are generally part of a decision feedback equalizer that may be implemented using conventional techniques. Outputs of the blocks 314a-314n generally present components of the feedback signal F1 presented to the second input of the block 302.

The block 303 may receive the input signal Y(T) at a first input and a feedback signal (e.g., F2) at a second input. An output of the block 303 may present a signal (e.g., E(T)) responsive to the input signal Y(T) and the feedback signal F2. The signal E(T) may be presented as an input to the blocks 305 and 307. Specifically, the signal E(T) may be sampled in response to a clock signal (e.g., CLK0(2)) and the samples presented to an input of the block 305. The signal E(T) may be sampled by the block 307 in response to a plurality of clock signals or phases (e.g., CLK(Q+1), . . . , CLK(2Q)). The samples generated by the block 307 are presented to a third input of the block 310 as signals E(K+1)1, . . . , E(K+1)Q.

The block 305 may have a crossing threshold of zero. The block 305 generally presents a positive (e.g., 1) output when the sampled signal is above the respective threshold and a negative (e.g., −1) output when the sampled signal is below the respective threshold. The output of the block 305 may be randomly 1 or −1 when the respective input signal is very close to the threshold value since the difference may be very small and below the sensitivity of the latch (e.g., may take a very long time to integrate to produce a signal that is large enough).

An output of the block 305 (e.g., DK(1)) may be presented to a fourth input of the block 310, an input of the block 313a, and a second input of the block 314a. An output of the block 313a (e.g., DK(3)) may be presented to an input of the block 313b, a first input of the block 315b, and an input of the block 314c. An output of the block 313b (e.g., DK(5)) may be presented to an input of the block 313c (not shown), a first input of the block 315d, and an input of the block 314d. The blocks 313c-313m may be connected similarly and may present respective data samples (e.g., DK(7), DK(9), etc.). The last respective data sample presented by the blocks 313c-313m generally depends upon whether N is even or odd. When N is even, the last respective data sample is DK(2L+1), where L=N/2. When N is odd, the last respective data sample is DK(2L−1), because N/2 is not an integer and L is set to the next higher integer (e.g., L=3 when N=5). The block 315a may have a second input that may receive the signal H1. The signal H1 may represent a tap weight. The blocks 315b-315n may similarly receive respective tap weight signals (e.g., H2, H3, . . . , H(N−1), H(N)) and respective data samples (e.g., DK(3), DK(4), DK(N), DK(N+1)).

The blocks 313a-313m and 315a-315n are generally part of a decision feedback equalizer that may be implemented using conventional techniques. Outputs of the blocks 315a-315n generally present components of the feedback signal F2 presented to the second input of the block 303. The block 310 may have an output that may present a signal that may adjust parameters of one or more equalizers of the receiver circuit.

Figure 14:
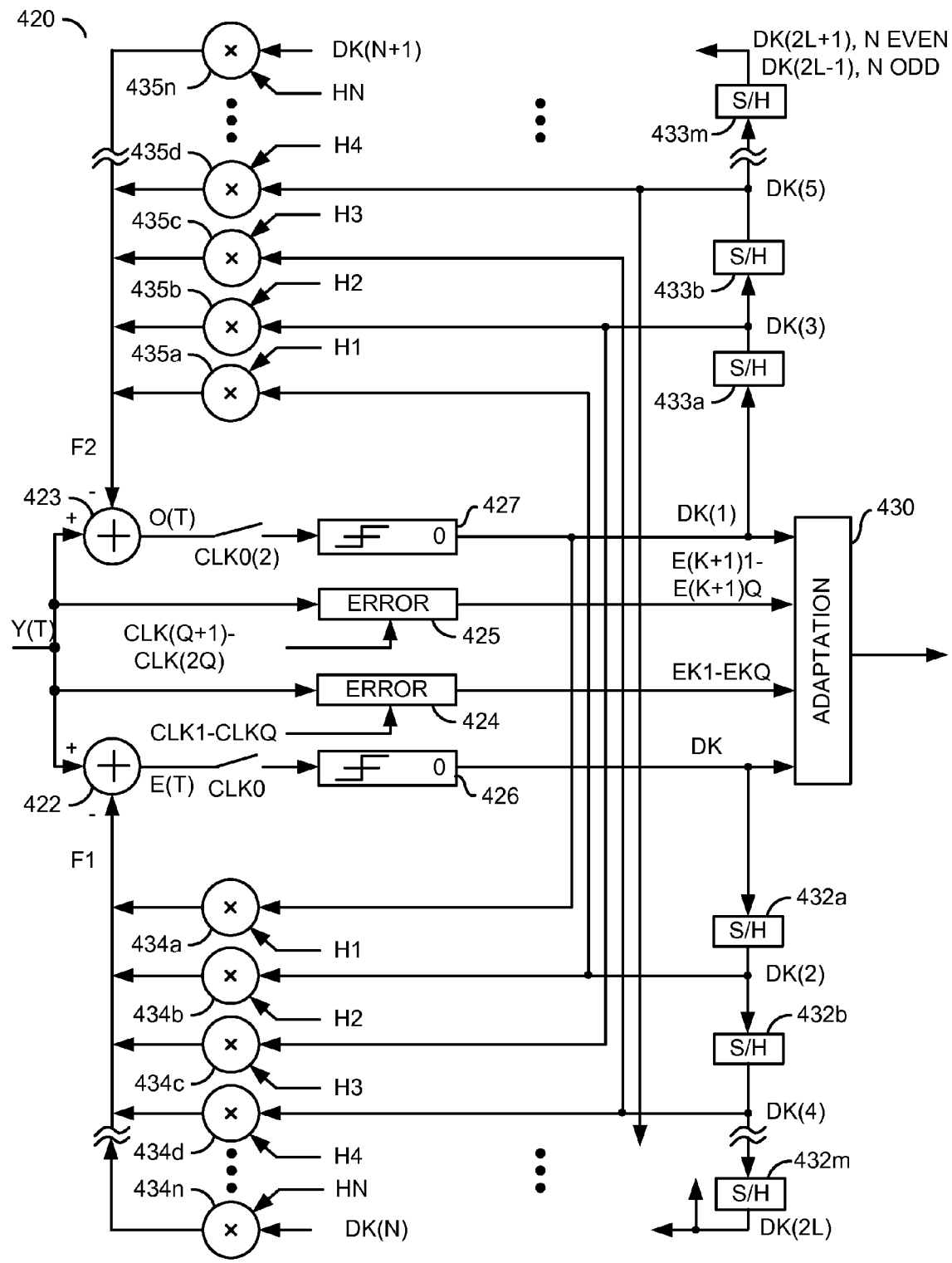
FIG. 14 is a diagram illustrating another example circuit implementing a half rate (or 2T) architecture decision feedback equalizer (DFE) and an adaptation circuit using error signals generated at a plurality of phases in accordance with another embodiment of the invention.

Referring to FIG. 14, a block diagram of a circuit 420 is shown illustrating an alternative example of a 2T architecture DFE and adaptation circuit in accordance with another example embodiment of the invention. The circuit 420 may be implemented similarly to the circuit 300, except that the error samples are taken prior to the DFE summing nodes. The circuit 420 generally implements a 2T-DFE structure comprising a first half and a second half. In one example, the first half of the circuit 420 may comprise a block (or circuit) 422, a block (or circuit) 424, a block (or circuit) 426, a block (or circuit) 430, a number of blocks (or circuits) 432a-432m, and a number of blocks (or circuits) 434a-434n. The second half of the circuit 420 may comprise a block (or circuit) 423, a block (or circuit) 425, a block (or circuit) 427, a number of blocks (or circuits) 433a-433m, and a number of blocks (or circuits) 435a-435n. Each half of the circuit 420 generally implements a respective set of the total number of DFE taps (e.g., N) used to provide decision feedback equalization. Each half of the circuit 420 may generate half of the total number of data samples used for DFE. Because each half of the circuit generates only half of the data samples, the two halves may operate at a lower speed (e.g., one-half the data rate) than the data rate of the input signal (e.g., Y(T)). As would be apparent to those skilled in the relavent art based upon the description herein, the architecture of the circuit 420 may be scaled to any nT architecture, where n is an integer (e.g., 1, 2, 3, . . . ). The circuits 422 to 435n may represent modules and/or blocks that may be implemented as hardware, software, a combination of hardware and software, or other implementations.

The circuits 422 and 423 may be implemented as adders. The circuits 424 and 425 may be implemented as error signal generators. The circuits 426 and 427 may be implemented as data latches. The circuits 424 and 425 may implement are configured to generate a plurality of error signals or samples (e.g., EK1, . . . , EKQ and E(K+1)1, E(K+1)Q, respectively). The error signals EK1, . . . , EKQ and E(K+1)1, E(K+1)Q may be used by adaptation loops of the block 430 to determine a number of tap weight values (e.g., H1-HN) for the respective DFE taps. The circuits 432a-432m and 433a-433m may implement sample and hold or shift register elements. The circuits 434a-434n and 435a-435n may be implemented as multipliers. Note that Q is used to represent the number of the error samples and respective clock signals (e.g., CLK1, . . . , CLKQ, EK1, . . . , EKQ, E(K+1)1, E(K+1)Q, etc.) merely to avoid confusion with other letters used to represent numbers of items (e.g., L, M, N, etc.), and not meant to indicate any relationship between the number of the various items and the number of error samples that may be implemented. The letters L, M, N, Q, etc. are used to indicate that any number of clocks, phases, taps, etc. may be implemented to meet the design criteria of a particular implementation.

The circuit 422 may receive the input signal (e.g., Y(T)) at a first input and a feedback signal (e.g., F1) at a second input. An output of the circuit 422 may present a signal (e.g., E(T)) responsive to the input signal Y(T) and the feedback signal F1. The signal Y(T) is present to an input of the circuit 424. The signal E(T) may be presented as an input to the circuit 426. Specifically, the signal Y(T) may be sampled by the circuit 424 in response to a plurality of clock signals or phases (e.g., CLK1, . . . , CLKQ) and the samples presented to a first input of the circuit 430 as the signals EK1, . . . , EKQ. The signal E(T) may be sampled in response to a clock signal (e.g., CLK0) and the samples presented to an input of the circuit 426.

The circuit 426 may have a crossing threshold of zero. The circuit 426 generally present a positive (e.g., 1) output when the sampled signal is above the respective threshold and a negative (e.g., −1) output when the sampled signal is below the respective threshold. The output of the circuit 426 is randomly 1 or −1 when the respective input signal is very close to the threshold value since the difference may be very small and below the sensitivity of the latch (e.g., may take a very long time to integrate to produce a signal that is large enough).

An output of the circuit 426 (e.g., DK) may be presented to a second input of the circuit 430 and an input of the circuit 432a. An output of the circuit 432a (e.g., DK(2)) may be presented to an input of the circuit 432b, a first input of the circuit 434b, and a first input of the circuit 435a. An output of the circuit 432b (e.g., DK(4)) may be presented to an input of the circuit 432c (not shown), a first input of the circuit 434d, and a first input of the circuit 435c. The circuits 432c-432m may be connected similarly and may present respective data samples (e.g., DK(6), DK(8), . . . , DK(2L−2), DK(2L)). The circuit 434a may have a second input that may receive a signal (e.g., H1). The signal H1 may represent a tap weight. The circuits 434b-434n may similarly receive respective tap weight signals (e.g., H2, H3, . . . , H(N−1), HN) and respective data samples (e.g., DK(2), DK(3), . . . , DK(N−1), DK(N)).

The tap weights H1, H2, . . . , H(N−1), and HN may be determined through adaptation based on signals EK1, . . . , EKQ, E(K+1)1, . . . , E(K+1)Q, DK, DK(1), DK(2), DK(3), . . . , DK(N−1), DK(N). In one example, a sign-sign LMS technique may be used to adjust the tap weights based on the error samples and the data samples. The circuits 432a-432m and 434a-434n are generally part of a decision feedback equalizer that may be implemented using conventional techniques. Outputs of the circuits 434a-434n generally present components of the feedback signal F1 presented to the second input of the circuit 422.

The circuit 423 may receive the input signal Y(T) at a first input and a feedback signal (e.g., F2) at a second input. An output of the circuit 423 may present a signal (e.g., O(T)) responsive to the input signal Y(T) and the feedback signal F2. The signal Y(T) may be presented as an input to the circuit 425. The signal O(T) may be presented as an input to the circuits 427. Specifically, the signal Y(T) may be sampled by the circuit 425 in response to a plurality of clock signals or phases (e.g., CLK(Q+1), ..., CLK(2Q)). The samples generated by the circuit 425 may be presented to a third input of the circuit 430 as the signals E(K+1)1, ..., E(K+1)Q. The signal O(T) may be sampled in response to a clock signal (e.g., CLK0(2)) and the samples presented to an input of the circuit 427. In one example, the clock signals CLK0 and CLK0(2) may be implemented as different phases of a single sampling clock signal.

The circuit 427 may have a crossing threshold of zero. The circuit 427 generally presents a positive (e.g., 1) output when the sampled signal is above the respective threshold and a negative (e.g., −1) output when the sampled signal is below the respective threshold. The output of the circuit 427 is randomly 1 or −1 when the respective input signal is very close to the threshold value since the difference may be very small and below the sensitivity of the latch (e.g., may take a very long time to integrate to produce a signal that is large enough).

An output of the circuit 427 (e.g., DK(1)) may be presented to a fourth input of the circuit 430, an input of the circuit 433a, and a second input of the circuit 434a. An output of the circuit 433a (e.g., DK(3)) may be presented to an input of the circuit 433b, an input of the circuit 434c, and a first input of the circuit 435b. An output of the circuit 433b (e.g., DK(5)) may be presented to an input of the circuit 433c (not shown), an input of the circuit 434e (not shown), and a first input of the circuit 435d. The circuits 433c-433m may be connected similarly and may present respective data samples (e.g., DK(7), DK(9), etc.). The last respective data sample presented by the circuits 433c-433m generally depends on whether N is even or odd. When N is even, the last respective data sample is DK(2L+1), where L=N/2. When N is odd, the last respective data sample is DK(2L−1), because N/2 is not an integer and L is set to the next higher integer (e.g., L=3 when N=5). The circuit 435a may have a second input that may receive the signal H1. The signal H1 may represent a tap weight. The circuits 435b-435n may similarly receive respective tap weight signals (e.g., H2, H3, ..., H(N−1), H(N)) and respective data samples (e.g., DK(3), DK(4), ..., DK(N), DK(N+1)). The circuits 433a-433m and 435a-435n are generally part of a decision feedback equalizer that may be implemented using conventional techniques. Outputs of the circuits 435a-435n generally present components of the feedback signal F2 presented to the second input of the circuit 423.

The circuit 430 may have an output that may present a signal that may be used to adjust one or more parameters of one or more equalizers of a receiver. In one example, the circuit 430 may be configured to implement a gradient function described above. The circuit 430 generally uses the signals received from the circuits 424-427. In general, the 2T architecture presents four inputs to the circuit 430 during every two symbol periods. For example, one data sample and a number of error samples are presented every symbol period, which are used by the circuit 430 to adapt equalizer parameters as described above.

Figure 15:
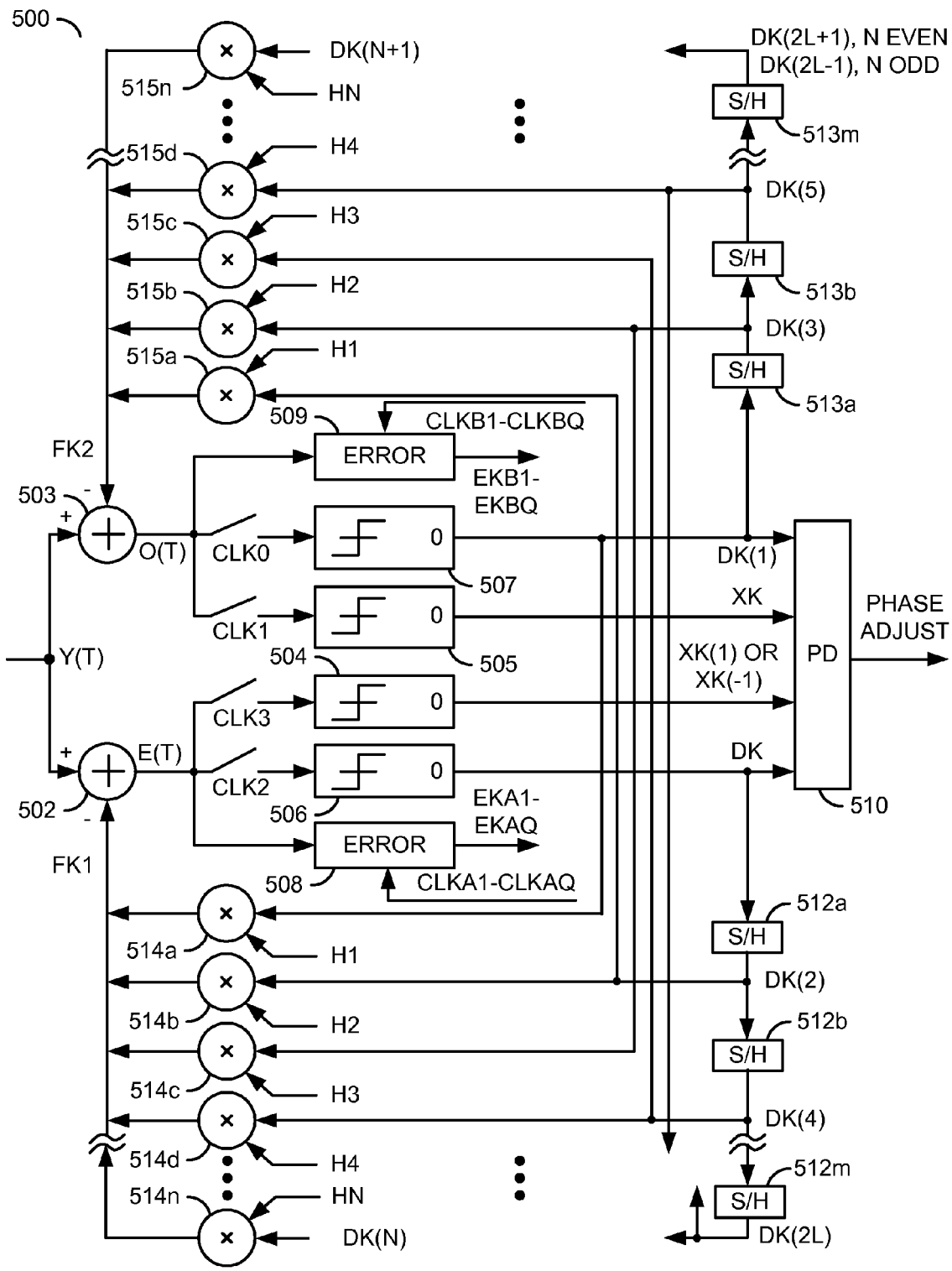
FIG. 15 is a diagram illustrating still another circuit implementing bang-bang phase detector (PD) along with a half rate (or 2T) architecture decision feedback equalizer (DFE), and generating error signals sampled at a plurality of phases in accordance with an embodiment of the invention.

Referring to FIG. 15, a block diagram of a circuit 500 is shown illustrating another example implementation of bang-bang CDR and DFE in accordance with another example embodiment of the invention. In one example, the circuit 500 may be implemented in a serializer/deserializer (SerDes) circuit. The circuit 500 may be implemented as part of a receiver. The circuit 500 generally implements a 2T-DFE structure comprising a first half and a second half. In one example, the first half of the circuit 500 may comprise a block (or circuit) 502, a block (or circuit) 504, a block (or circuit) 506, a block (or circuit) 508, a block (or circuit) 510, a number of blocks (or circuits) 512a-512m, and a number of blocks (or circuits) 514a-514n. The second half of the circuit 500 may comprise a block (or circuit) 503, a block (or circuit) 505, a block (or circuit) 507, a block (or circuit) 509, a number of blocks (or circuits) 513a-513m, and a number of blocks (or circuits) 515a-515n. Each half of the circuit 500 generally implements a respective set of the total number of DFE taps (e.g., N) used to provide decision feedback equalization. Each half of the circuit 500 may generate half of the total number of data samples used for DFE. Because each half of the circuit generates only half of the data samples, the two halves may operate at a lower speed (e.g., one-half the data rate) than the data rate of the input signal (e.g., Y(T)). As would be apparent to those skilled in the relavent art based upon the description herein, the architecture of the circuit 500 may be scaled to any nT architecture, where n is an integer (e.g., 1, 2, 3, ...). The circuits 502 to 515n may represent modules and/or blocks that may be implemented as hardware, software, a combination of hardware and software, or other implementations.

The circuits 502 and 503 may be implemented as adders. The circuits 504 and 505 may be implemented as crossing latches. The circuits 506 and 507 may be implemented as data latches. Each of the circuits 508 and 509 may implement an error signal generator configured to generate a plurality of error signals or samples (e.g., EKA1, ..., EKAQ and EKB1, ..., EKBQ, respectively). The error signals EKA1, ..., EKAQ and EKB1, ..., EKBQ may be used by adaptation loops configured to determine a number of tap weight values (e.g., H1-HN) for the respective DFE taps. The circuit 510 may implement a bang-bang phase detector (PD) using conventional techniques. The circuits 512a-512m and 513a-513m may implement sample and hold or shift register elements. The circuits 514a-514n and 515a-515n may be implemented as multipliers.

The circuit 502 may receive an input signal (e.g., Y(T)) at a first input and a feedback signal (e.g., FK1) at a second input. An output of the circuit 502 may present a signal (e.g., E(T)) responsive to the input signal Y(T) and the feedback signal FK1. The signal E(T) may be presented as an input to the circuits 504, 506, and 508. Specifically, the signal E(T) may be sampled in response to a first clock signal (e.g., CLK3) and the samples presented to an input of the circuit 504. The signal E(T) may be sampled also in response to a second clock signal (e.g., CLK2) and the samples presented to an input of the circuit 506. The circuit 508 may be configured to sample the signal E(T) in response to a number of clock signals or phases (e.g., CLKA1, ..., CLKAQ). The samples generated by the circuit 508 may be presented as the error signals (or samples) EKA1, ..., EKAQ.

The circuits 504 and 506 may have a crossing threshold of zero. The circuits 504 and 506 generally present a positive (e.g., 1) output when the sampled signal is above the respective threshold and a negative (e.g., −1) output when the sampled signal is below the respective threshold. The output of the latches 504 and 506 is randomly 1 or −1 when the respective input signals are very close to the threshold value since the difference may be very small and below the sensitivity of the latch (e.g., may take a very long time to integrate to produce a signal that is large enough).

An output of the circuit 504 (e.g., XK(1) or XK(−1)) may be presented to a first input of the circuit 510. An output of the circuit 506 (e.g., DK) may be presented to a second input of the circuit 510 and an input of the circuit 512a. An output of the circuit 512a (e.g., DK(2)) may be presented to an input of the circuit 512b, a first input of the circuit 514b, and a first input of the circuit 515a. An output of the circuit 512b (e.g., DK(4)) may be presented to an input of the circuit 512c (not shown), a first input of the circuit 514d, and a first input of the circuit 515c. The circuits 512c-512m may be connected similarly and may present respective data samples (e.g., DK(6), DK(8), . . . , DK(2L−2), DK(2L)). The circuit 514a may have a second input that may receive a signal (e.g., H1). The signal H1 may represent a tap weight. The circuits 514b-514n may similarly receive respective tap weight signals (e.g., H2, H3, . . . , H(N−1), HN) and respective data samples (e.g., DK(2), DK(3), DK(N−1), DK(N)).

The tap weights H1, H2, . . . , H(N−1), and HN may be determined through adaptation based on the signals EKA1, EKAQ, EKB1, . . . , EKBQ, DK, DK(1), DK(2), DK(3), . . . , DK(N−1), DK(N). In one example, a sign-sign LMS technique may be used to adjust the tap weights based on the error samples and the data samples. The circuits 512a-512m and 514a-514n are generally part of a decision feedback equalizer that may be implemented using conventional techniques. Outputs of the circuits 514a-514n generally present components of the feedback signal FK1 presented to the second input of the circuit 502.

The circuit 503 may receive the input signal Y(T) at a first input and a feedback signal (e.g., FK2) at a second input. An output of the circuit 503 may present a signal (e.g., O(T)) responsive to the input signal Y(T) and the feedback signal FK2. The signal O(T) may be presented as an input to the circuits 505, 507, and 509. Specifically, the signal O(T) may be sampled in response to a third clock signal (e.g., CLK1) and the samples presented to an input of the circuit 505. The signal O(T) may be sampled also in response to a fourth clock signal (e.g., CLK0) and the samples presented to an input of the circuit 507. The circuit 509 may sample the signal O(T) in response to a plurality of clock signals or phases (e.g., CLKB1, . . . , CLKBQ). In one example, the clock signals may be implemented generally as different phases of a sampling clock signal.

The circuits 505 and 507 may have a crossing threshold of zero. The circuits 505 and 507 generally present a positive (e.g., 1) output when the sampled signal is above the respective threshold and a negative (e.g., −1) output when the sampled signal is below the respective threshold. The output of the latches 505 and 507 is randomly 1 or −1 when the respective input signals are very close to the threshold value since the difference may be very small and below the sensitivity of the latch (e.g., may take a very long time to integrate to produce a signal that is large enough).

An output of the circuit 505 (e.g., XK) may be presented to a third input of the circuit 510. An output of the circuit 507 (e.g., DK(1)) may be presented to a fourth input of the circuit 510, an input of the circuit 513a, and a second input of the circuit 514a. An output of the circuit 513a (e.g., DK(3)) may be presented to an input of the circuit 513b, an input of the circuit 514c, and a first input of the circuit 515b. An output of the circuit 513b (e.g., DK(5)) may be presented to an input of the circuit 513c (not shown), an input of the circuit 514e (not shown), and a first input of the circuit 515d. The circuits 513c-513m may be connected similarly and may present respective data samples (e.g., DK(7), DK(9), etc.). The last respective data sample presented by the circuits 513c-513m generally depends on whether N is even or odd. When N is even, the last respective data sample is DK(2L+1), where L=N/2. When N is odd, the last respective data sample is DK(2L−1), because N/2 is not an integer and L is set to the next higher integer (e.g., L=3 when N=5). The circuit 515a may have a second input that may receive the signal H1. The signal H1 may represent a tap weight. The circuits 515b-515n may similarly receive respective tap weight signals (e.g., H2, H3, . . . , H(N−1), H(N)) and respective data samples (e.g., DK(3), DK(4), DK(N), DK(N+1)). The circuits 513a-513m and 515a-515n are generally part of a decision feedback equalizer that may be implemented using conventional techniques. Outputs of the circuits 515a-515n generally present components of the feedback signal FK2 presented to the second input of the circuit 503.

The circuit 510 may have an output that may present a signal (e.g., PHASE ADJUST) that may be used to adjust the phase of the sampling clock(s) and, consequently, the sampling phases of the circuit 500. In one example, the circuit 510 may be configured to implement a transfer function that may be summarized by the following TABLE 1:

TABLE 1

| XK | DK(1) | DK | PHASE UP OR DOWN |
|---|---|---|---|
| 1 | 1 | −1 | 1 |
| −1 | 1 | −1 | −1 |
| 1 | −1 | 1 | −1 |
| −1 | −1 | 1 | 1 |
| 1 | 1 | 1 | 0 |
| −1 | 1 | 1 | −1 |
| −1 | −1 | −1 | 0 |
| 1 | −1 | −1 | −1 |

The circuit 510 generally uses three of the four signals received from the latches 504-507. In general, the 2T architecture presents four inputs to the circuit 510 during every two symbol periods. For example, one data sample and one crossing sample are present every symbol period, which are used by the circuit 510 as illustrated in TABLE 1 above. The circuit 510 generally implements a sliding window technique that adjusts the sampling phase of the circuit 500 using three of the four signals. In another example, the circuit 510 may be replaced with the phase adjustment circuit illustrated in FIG. 12.

Referring to FIG. 16, a flow diagram is shown illustrating a process (or method) 600 for adapting equalizer parameters of a receiver circuit in accordance with an example embodiment of the invention. The process 600 may comprise a step (or state) 602, a step (or state) 604, and a step (or state) 606. The step 602 may comprise determining a value for a first coefficient ALPHA and a second coefficient BETA. The values of the coefficients ALPHA and BETA may be predetermined (e.g., based on measurements of a DFE feedback waveform, etc.) or set based upon user input. When the values of the coefficients ALPHA and BETA have been determined, the process 600 may move to the step 604. In the step 604, the process 600 generates a plurality of error signals (e.g., EK1, . . . , EKQ) for every symbol. When the error signals for a symbol have been generated, the process 600 may move to the step 606. In the step 606, the process 600 adjusts one or more equalizer parameters (e.g., gain, pole, tap weights, etc.) of the receiver circuit. In one example, the adjustments to the equalizer parameters may be based upon a gradient (ALPHA*(−EK1)+BETA*(EKQ))*DK(1). However, other gradients employing a plurality of error samples may be implemented accordingly to meet the design criteria of a particular implementation.

Embodiments of the invention generally provide a method and/or apparatus for implementing adaptation of equalizer settings using error signals sampled at several different phases that may (i) combine the best of the center equalization and edge equalization, (ii) be configurable to have only center equalization, only edge equalization or a combination of center equalization and edge equalization, and/or (iii) have low implementation cost. The ability to have only center equalization, only edge equalization or a combination of center equalization and edge equalization is useful because different applications have different needs. For example, optical channels prefer edge equalized linear equalizers, while backplanes have better performance with center edge equalized linear equalizers. The implementation cost may be low because, when both bang-bang CDR and DFE are employed, error signals that are sampled 90 degrees apart are already available. Since the error signals are already available, no additional analog circuits are needed.

Figure 17:
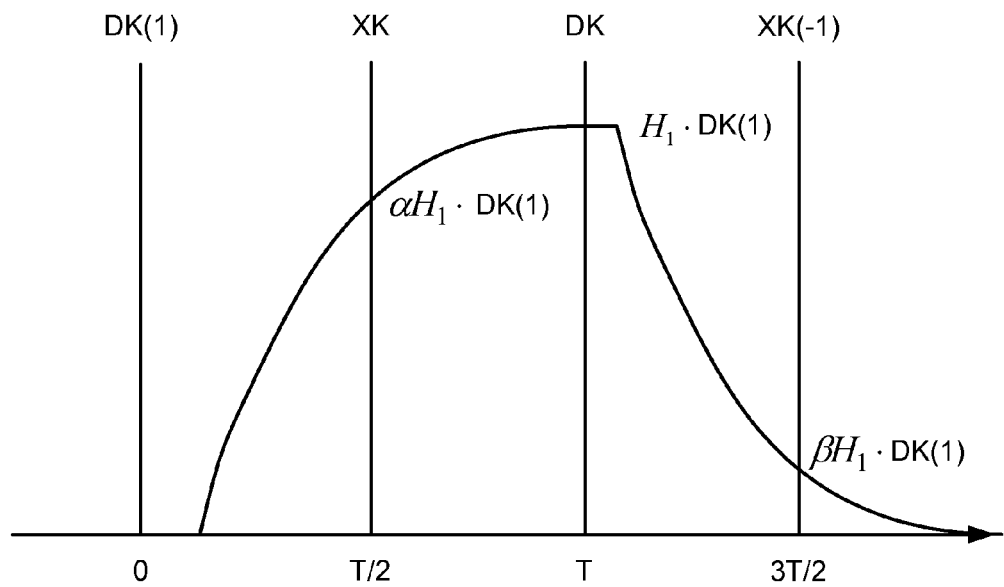
FIG. 17, is a diagram illustrating a DFE feedback waveform.

Referring to FIG. 17, a diagram is shown illustrating a DFE feedback waveform. When bang-bang CDR is used together with a DFE, coupling between the bang-bang CDR and the DFE may occur. The DFE feedback is not only applied at the data sample, but also at error and crossing samples prior to the data sample and following the data sample. In general, a significant portion of the DFE feedback may be applied at the other sampling points. For example, if the first tap DFE feedback applied at the data sample is expressed as H1*DK(1), the DFE feedback applied at the prior sample point may be expressed as ALPHA*H1*DK(1), where ALPHA may range from 40% to 90%, depending on the implementation. After the feedback (e.g., H1*DK(1)) reaches its full level, the feedback is generally reduced to zero. However, the feedback does not reach zero instantaneously. The DFE feedback applied at the subsequent sample point may be expressed as BETA*H1*DK(1), where BETA may range from 0% to 100%, depending on the implementation. The terms ALPHA and BETA are used to indicate that different amounts of feedback may be applied at the rising and the falling edges.

In general, for a 2T architecture BETA in the analysis shows that using the right crossing sample has no coupling from the DFE. Although XK(−1) may include the BETA term, the BETA term is averaged out since DK(1) is uncorrelated with DK. Also, when the right crossing is used, DK=−DK(−1) and is uncorrelated with DK(1). When the left crossing is used, DK=−DK(1), so DK is correlated with DK(1). For a 1T architecture, XK(−1) will have both ALPHA and BETA terms. In an nT architecture where n>1, the ALPHA term drops out because the DFE feedback is in a different branch.

The functions illustrated by the diagrams of FIGS. 4-16 may be implemented (e.g., performed, simulated, realized, etc.) using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

Embodiments of the invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

Embodiments of the invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of various embodiments of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While embodiments of the invention have been particularly shown and described with reference to the figures, it will be understood by those skilled in the art that various changes in form and details may be made without departing from the scope of the invention.

The invention claimed is:

1. An apparatus comprising:
an error sample generating circuit comprising a plurality of detector circuits, each of said plurality of detector circuits configured to generate a respective error sample in response to a respective one of a plurality of phases; and
an adaptation circuit configured to adjust one or more equalizer settings based upon a data sample and the error samples, wherein said adaptation circuit is further configured to generate a phase adjustment signal.

2. The apparatus according to claim 1, further comprising a decision feedback equalizer (DFE).

3. The apparatus according to claim 1, further comprising a linear equalizer (LE).

4. The apparatus according to claim 3, wherein said one or more equalizer settings comprise at least one of a gain, a pole and a tap weight.

5. The apparatus according to claim 1, wherein said one or more equalizer settings comprise tap weights of a decision feedback equalizer (DFE).

6. The apparatus according to claim 1, wherein said one or more equalizer settings comprise pole and gain of a continuous-time decision feedback equalizer (CT-DFE).

7. The apparatus according to claim 1, wherein said error sample generating circuit generates said error samples based upon either an output of a linear equalizer, an output of a summing node configured to combine said output of said linear equalizer with an output of a decision feedback equalizer, or said output of said linear equalizer and said output of said summing node.

8. The apparatus according to claim 1, wherein said adaptation circuit is further configured to:
generate a first product by multiplying a first error sample by a first coefficient;
generate a second product by multiplying a second error sample by a second coefficient;
generate a third product by multiplying a difference of said first product and said second product by said data sample; and
adjust a gain of a linear equalizer based upon said third product.

9. The apparatus according to claim 1, wherein said adaptation circuit is further configured to
generate a first product by multiplying a first error sample by a first coefficient;
generate a second product by multiplying a second error sample by a second coefficient;
generate a third product by multiplying a difference of said first product and said second product by said data sample; and
adjust one or more tap weights of a decision feedback equalizer or pole and gain of a continuous-time decision feedback equalizer (CT-DFE) based upon said third product.

10. The apparatus according to claim 1, wherein said adaptation circuit is further configured to;
generate a first product by multiplying a first error sample by a first coefficient;
generate a second product by multiplying a second error sample by a second coefficient;
generate a third product by multiplying a difference of said first product and said second product with a plurality of previous data samples; and
adjust one or more of a gain, a pole, and a tap weight of a linear equalizer based upon said third product.

11. The apparatus according to claim 1, wherein said adaptation circuit is further configured to:
generate a first product by multiplying a first error sample by a first coefficient;
generate a second product by multiplying a second error sample by a second coefficient;
generate a third product by multiplying a difference of said first product and said second product with a plurality of previous data samples; and
adjust one or more tap weights of a decision feedback equalizer or pole and gain of a continuous-time decision feedback equalizer (CT-DFE) based upon said third product.

12. The apparatus according to claim 1, wherein said adaptation circuit is further configured to:
generate a plurality of first products by multiplying a first error sample by a plurality of first data samples;
generate a plurality of second products by multiplying a second error sample by a plurality of second data samples; and
adjust one or more of a gain, a pole, and a tap weight of an equalizer based upon a sum of said plurality of first products and said plurality of second products.

13. A method of adjusting equalizer settings in a receiver path comprising the steps of:
generating a plurality of error samples at a plurality of phases;
adjusting one or more of said equalizer settings of said receiver path based upon a data sample and said plurality of error samples;
generating a first product by multiplying a first error sample by a first coefficient;
generating a second product by multiplying a second error sample by a second coefficient;
generating a third product by multiplying a difference of said first product and said second product by said data sample; and
adjusting one or more of a gain, a pole, and a tap weight of a linear equalizer based upon said third product.

14. The method according to claim 13, further comprising:
adjusting one or more tap weights of a decision feedback equalizer or pole and gain of a continuous-time decision feedback equalizer (CT-DFE) based upon said third product.

15. The method according to claim 13, further comprising:
generating said third product by multiplying said difference of said first product and said second product with a plurality of previous data samples.

16. The method according to claim 15, further comprising:
adjusting one or more tap weights of a decision feedback equalizer or pole and gain of a continuous-time decision feedback equalizer (CT-DFE) based upon said third product.

17. The method according to claim 13, further comprising:
generating a plurality of first products by multiplying said first error sample by a plurality of first data samples;
generating a plurality of second products by multiplying said second error sample by a plurality of second data samples; and
adjusting one or more of said gain, said pole, and said tap weight of said equalizer based upon a sum of said plurality of first products and said plurality of second products.

18. The method according to claim 13, wherein said one or more equalizer settings comprise tap weights of a decision feedback equalizer (DFE).

19. The method according to claim 13, wherein said one or more equalizer settings comprise pole and gain of a continuous-time decision feedback equalizer (CT-DFE).

20. An apparatus comprising:
an error sample generating circuit configured to generate error samples at a plurality of phases; and
an adaptation circuit configured to generate a first product by multiplying a first error sample by a first coefficient, a second product by multiplying a second error sample by a second coefficient, and a third product by multiplying a difference of said first product and said second product by a data sample, wherein said adaptation circuit adjusts one or more equalizer settings based upon said third product.

* * * * *